(12) United States Patent
Hazlehurst

(10) Patent No.: US 7,531,092 B2
(45) Date of Patent: May 12, 2009

(54) PUMP

(75) Inventor: Fred Hazlehurst, Union, NJ (US)

(73) Assignee: Hayward Industries, Inc., Elizabeth, NJ (US)

( * ) Notice: Subject to any disclaimer, the term of this patent is extended or adjusted under 35 U.S.C. 154(b) by 249 days.

(21) Appl. No.: 11/541,924

(22) Filed: Sep. 29, 2006

(65) Prior Publication Data

US 2007/0114168 A1 May 24, 2007

Related U.S. Application Data

(60) Provisional application No. 60/732,008, filed on Nov. 1, 2005.

(51) Int. Cl.
*F03B 11/08* (2006.01)
*F04D 29/70* (2006.01)
*B01D 35/02* (2006.01)

(52) U.S. Cl. .................. 210/416.2; 210/232; 415/121.2

(58) Field of Classification Search ............. 210/167.1, 210/232, 416.1, 416.2; 415/121.2; 4/507
See application file for complete search history.

(56) References Cited

U.S. PATENT DOCUMENTS

| | | | |
|---|---|---|---|
| D131,875 S | | 3/1942 | Houston |
| 3,468,260 A | | 9/1969 | Belden |
| 3,637,331 A | * | 1/1972 | Smith et al. ............. 417/423.9 |
| 3,744,635 A | * | 7/1973 | Horvath ........................ 210/87 |
| 3,920,352 A | * | 11/1975 | Speck et al. ................ 415/200 |
| 3,966,363 A | | 6/1976 | Rowley et al. |
| D255,480 S | | 6/1980 | Zieg |
| 4,242,064 A | | 12/1980 | Uncles |
| 4,269,557 A | | 5/1981 | Kidd |
| 4,287,067 A | | 9/1981 | Dyner |
| 4,353,846 A | * | 10/1982 | Mehrens et al. ................. 261/4 |
| 4,473,470 A | | 9/1984 | Loutit |
| 4,629,557 A | | 12/1986 | Tobias |
| 4,773,823 A | | 9/1988 | Pease |
| 4,783,260 A | * | 11/1988 | Kurihara ..................... 210/232 |

(Continued)

FOREIGN PATENT DOCUMENTS

EP  0657602  * 6/1995

(Continued)

OTHER PUBLICATIONS

U.S. Appl. No. 29/267,940, Title: Pump Housing, filed Oct. 25, 2006, Inventors: Griffin, et al.

(Continued)

*Primary Examiner*—Fred Prince
(74) *Attorney, Agent, or Firm*—McCarter & English, LLP

(57) ABSTRACT

Disclosed herein is a liquid pump for use with a fluid circulation system for a recreational water body. The liquid pump includes a strainer housing, a pump housing assembly secured to the strainer housing, and a lock ring fastened to the pump housing assembly. The pump housing assembly includes an outlet that is rotatable between a first position and a second position and further includes an annular protuberance defining an inlet. The strainer housing includes an outlet, and the annular protuberance extends through the outlet of the strainer housing into a chamber thereof. A clip is positioned within the chamber and releasably secures the annular protuberance so as to inhibit inadvertent disengagement of the strainer housing from the pump housing assembly.

29 Claims, 16 Drawing Sheets

U.S. PATENT DOCUMENTS

| | | | |
|---|---|---|---|
| D299,143 S | 12/1988 | Hazlehurst | |
| 4,871,303 A | 10/1989 | Roesler | |
| 4,898,513 A * | 2/1990 | Hon | 415/121.2 |
| 5,156,535 A | 10/1992 | Budris et al. | |
| 5,409,606 A | 4/1995 | Spencer | |
| 5,624,559 A | 4/1997 | Levin et al. | |
| 5,858,234 A * | 1/1999 | Sukun | 210/460 |
| 5,897,787 A | 4/1999 | Keller | |
| D419,567 S | 1/2000 | Weiss | |
| 6,041,453 A | 3/2000 | Barrow et al. | |
| D425,911 S | 5/2000 | Fleischer et al. | |
| 6,149,407 A | 11/2000 | Laing | |
| 6,287,466 B1 | 9/2001 | Yassin | |
| D450,106 S | 11/2001 | Herr | |
| D450,327 S | 11/2001 | Mori et al. | |
| 6,379,127 B1 | 4/2002 | Andrews et al. | |
| D466,522 S | 12/2002 | Huang | |
| 6,554,587 B2 | 4/2003 | Paolini et al. | |
| 6,623,245 B2 | 9/2003 | Meza et al. | |
| 6,659,717 B1 | 12/2003 | Kao | |
| 6,824,354 B2 | 11/2004 | Laing | |
| D507,579 S | 7/2005 | Rossman et al. | |
| 6,939,463 B2 | 9/2005 | Leaverton | |
| 6,955,637 B1 | 10/2005 | Montano et al. | |
| 6,974,303 B2 | 12/2005 | Wang | |
| 7,001,159 B2 | 2/2006 | Peterson, Jr. et al. | |
| D517,570 S | 3/2006 | Stiles, Jr. et al. | |
| 7,063,791 B2 | 6/2006 | Miner | |
| D536,705 S | 2/2007 | Griffin et al. | |
| 7,223,337 B1 * | 5/2007 | Franzino et al. | 210/241 |
| D550,805 S | 9/2007 | Hazlehurst | |
| D551,256 S | 9/2007 | Pecca et al. | |
| D557,374 S | 12/2007 | Pecca | |
| D568,340 S | 5/2008 | Stiles, Jr. et al. | |
| 2001/0021613 A1 | 9/2001 | Fadeley et al. | |
| 2004/0091373 A1 | 5/2004 | Terry et al. | |
| 2005/0019154 A1 | 1/2005 | Dial | |
| 2005/0084401 A1 | 4/2005 | Coray et al. | |
| 2005/0100455 A1 | 5/2005 | Tuddenham | |
| 2005/0118039 A1 | 6/2005 | Shorten et al. | |
| 2005/0158194 A1 | 7/2005 | Sloan et al. | |
| 2006/0088423 A1 | 4/2006 | Brunet et al. | |
| 2007/0114162 A1 | 5/2007 | Stiles et al. | |

FOREIGN PATENT DOCUMENTS

| | | | |
|---|---|---|---|
| EP | 1267085 | * | 12/2002 |
| JP | 6-341398 | * | 12/1994 |
| WO | WO 00/68575 | | 11/2000 |

OTHER PUBLICATIONS

U.S. Appl. No. 11/904,426, Title: Pump Housing Coupling, filed Sep. 27, 2007, Inventor: Jason W. Parcell, claiming priority of U.S. Appl. No. 60/848,074, filed Sep. 29, 2006.

U.S. Appl. No. 60/732,439, Title: Strainer Basket, filed Oct. 31, 2005, Inventor: Jeffrey Pecca.

Sta-Rite® Owner's Manual for the Max-E-Glass II™ and Dura-Glass II™ Centrifugal Pumps with Integral Trap (2003).

Sta-Rite® Basket C8-58P (2003) (Perspective and Six Orthogonal View Photographs).

Pages from various Internet sources printed on Oct. 25, 2005.

Textron, Inc., Various Textron Bushings, Printouts from http://www.avdel.textron.com (at least as early as Jan. 2006).

Hayward Buyer's Guide and Parts Price List, effective Dec. 29, 2003 (4 pages) Publication Date Unknown.

Notice of Allowance dated Oct. 23, 2008, from pending U.S. Appl. No. 11/975,254 (11 pages) (issue fee not paid).

* cited by examiner

PUMP

CROSS-REFERENCE TO RELATED APPLICATIONS

The present application claims the benefit under 35 U.S.C. § 119(e) of U.S. Provisional Application No. 60/732,008 filed Nov. 1, 2005, which is hereby incorporated by reference in its entirety for all purposes.

FIELD OF THE INVENTION

The present invention relates to pumps and, more particularly, to centrifugal pumps for use in connection with fluid circulation systems for swimming pools, spas, and other recreational bodies of water.

BACKGROUND OF THE INVENTION

Numerous pumps have been developed in the past for use in connection with fluid circulation systems for swimming pools, spas, whirlpools and the like. Since a pump is the heart of a fluid circulation system, it should function optimally at all times in order for one to gain the maximal amount of use and enjoyment of the associated swimming pool, spa, etc. Consequently, any required replacement, repair or maintenance of the pump and its associated components must be conducted quickly and efficiently in order to reduce any downtime of the system as well as to reduce any associated labor costs. Because various components of many conventional pumps are assembled by threads, bolts or the like, assembly and disassembly of such pumps are often time-consuming, inefficient and costly.

Also, a pump should adapt easily to the specific configuration of the existing fluid circulation system. For example, a return line of the fluid circulation system (which is typically connected to the pump, directly or indirectly) could be positioned either horizontally, vertically, or in any position therebetween; and, therefore, the outlet of the pump must be aligned with the return line accordingly. However, many conventional pumps are not easily adaptable to a wide variety of configurations of fluid systems, and doing so typically involves substantial or total disassembly of the pumps. As a result, much time and labor are required to make the pumps adaptable. Sometimes, a contractor who has been retained to install the pump must carry on hand two sets of pumps, one having a vertically positioned outlet and one having a horizontally positioned outlet, in order to ensure he or she has the correct pump that will adapt to the specific configuration of the fluid circulation system. In view of the foregoing circumstances, there is a need for a pump that is designed for quick and easy assembly and disassembly and for selective configuration of its components to suit different operational requirements and configurations of the fluid circulation system.

In addition, many conventional pumps have strainer baskets that do not provide for an alternate and free fluid flow path when their associated strainer baskets become clogged with leaves and other large debris. As a result, the fluid flow through the pump becomes impeded, thereby resulting in the inefficient operation, or a complete failure of, the pump. Accordingly, there is a need for a pump that provides an alternate and free fluid flow path in the event that its associated strainer basket becomes clogged.

SUMMARY OF THE INVENTION

The present invention overcomes the disadvantages and shortcomings of the prior art discussed above by providing a new and improved pump, which includes a strainer housing, a pump housing assembly, and motor that are removably attached to each other such that the pump housing assembly is positioned between the strainer housing and the motor. The pump housing assembly includes a motor lock ring, which is fixed to the motor, and a casing that is attached rotatably to the motor lock ring. The lock ring includes a push-button having a latch, while the casing includes at least two separate, spaced apart locking tabs that are each sized and shaped to engage the latch of the lock ring. The casing can be rotated so that one of its locking tabs engages the latch of the motor lock ring, which enables a user to configure the outlet to a vertical position, a horizontal position, or any position therebetween. A simple push of the button of the motor lock ring disengages the latch from the locking tab and enables a user to, once again, rotate the casing and change the position of the outlet. In some embodiments of the invention, only the strainer housing need be unfastened from the casing in order to rotate the casing, such that a minimal amount of disassembly time is contemplated for configuring the pump to adapt to the particular configuration of the fluid circulation system (e.g., the particular position of the return line).

The pump also includes a strainer basket, which is configured to provide an auxiliary fluid flow path around an outer surface of the basket in the event that the basket becomes clogged with leaves and other large debris. The basket includes a set of internal fins extending inwardly from an inner surface of the basket proximate to the outlet of the strainer chamber. The internal fins prevent leaves and other large debris from blocking perforations in the basket proximate to the outlet of the chamber, thereby keeping the fluid flow path into the outlet of the chamber clear. The basket also includes a plurality of external fins that extend outwardly from the outer surface of the basket. The external fins engage an inner surface of a strainer chamber of the strainer housing, thereby creating a space between the inner surface of the chamber and the outer surface of the basket which provides an alternate fluid flow path in the event the basket becomes clogged. Also, in the event that the basket becomes clogged, the external fins prevent the basket from expanding substantially and hence prevent a decrease in the size of the fluid path within the chamber. In addition, the basket and the strainer chamber are each sized and shaped so that the basket does not substantially rotate within the chamber when installed therein, which keeps the basket aligned properly within the chamber.

Specifically, the present invention has been adapted for use in connection with fluid circulation systems for swimming pools, spas, whirlpools, hot tubs, baths, and other recreational bodies of water. However, the present invention can be adapted for use in connection with other fluid circulation systems in various commercial, industrial and residential settings. Further features and advantages of the invention will appear more clearly on a reading of the detailed description of an exemplary embodiment of the invention, which is given below by way of example only with reference to the accompanying drawings.

BRIEF DESCRIPTION OF THE DRAWINGS

For a more complete understanding of the present invention, reference is made to the following detailed description of an exemplary embodiment considered in conjunction with the accompanying drawings, in which.

DETAILED DESCRIPTION OF THE EXEMPLARY EMBODIMENT

Figure 1:
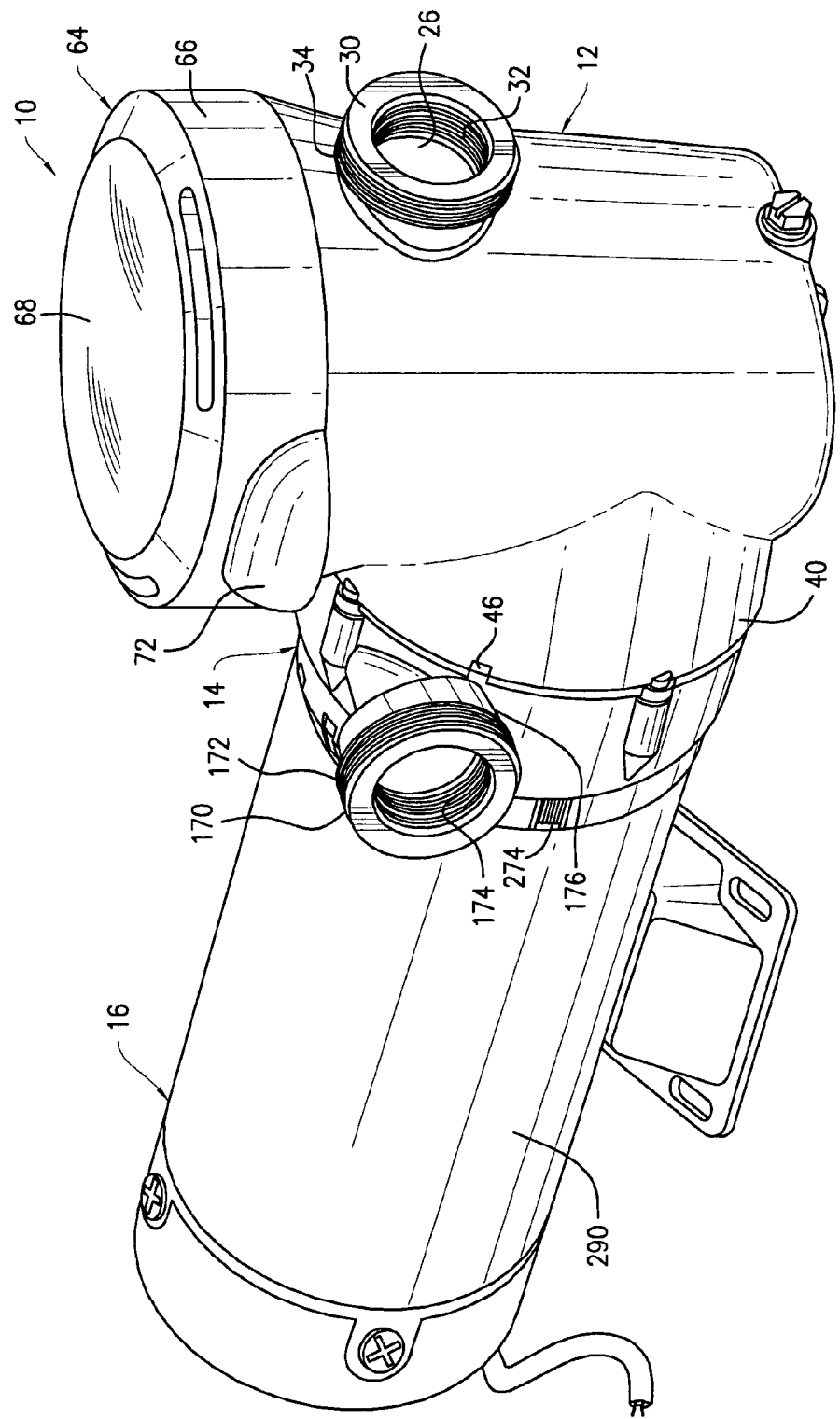
FIG. 1 is a front perspective view of a pump constructed in accordance with one exemplary embodiment of the present invention.
Figure 2A:
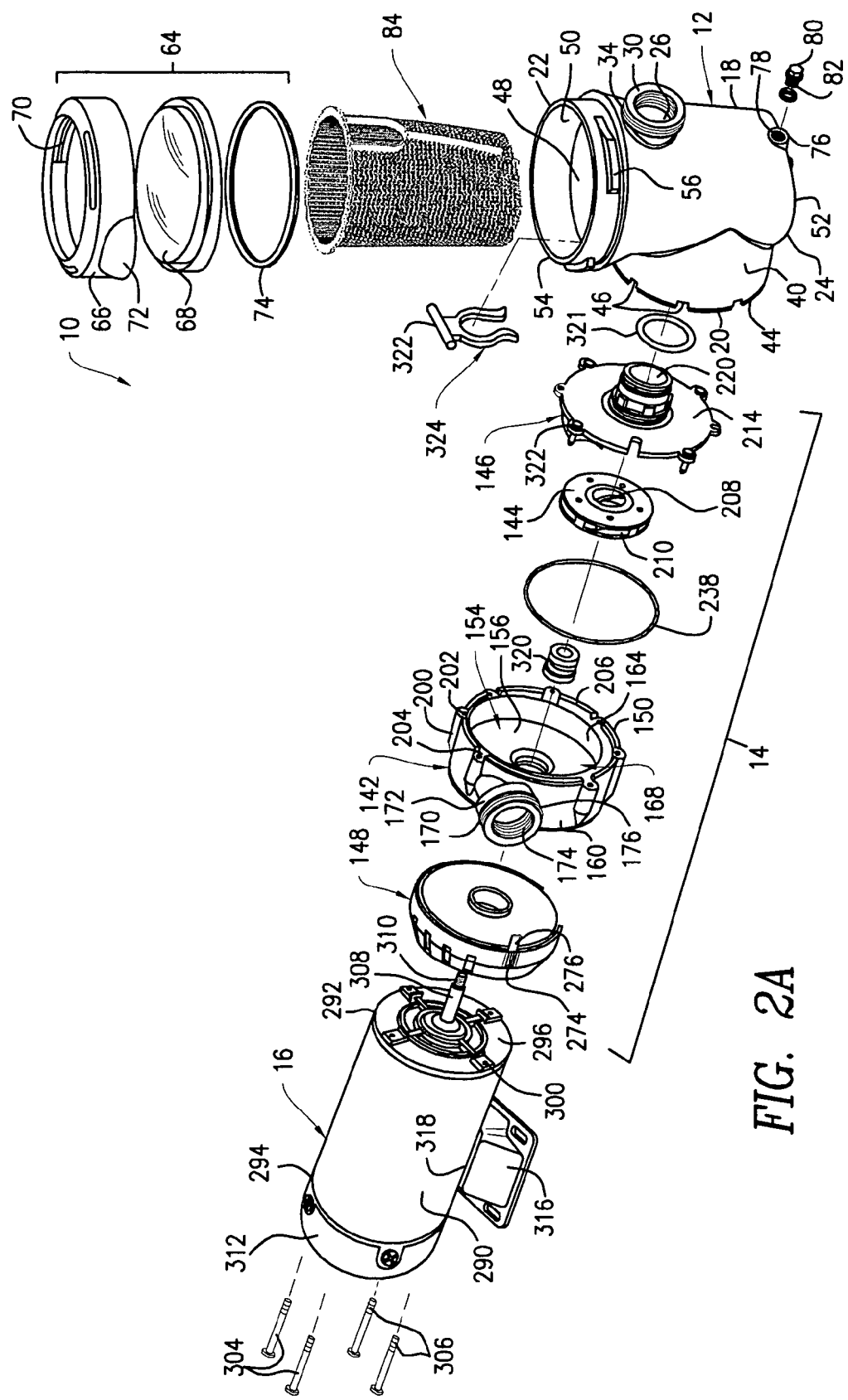
FIG. 2A is an exploded front perspective view of the pump shown in FIG. 1.
Figure 2B:
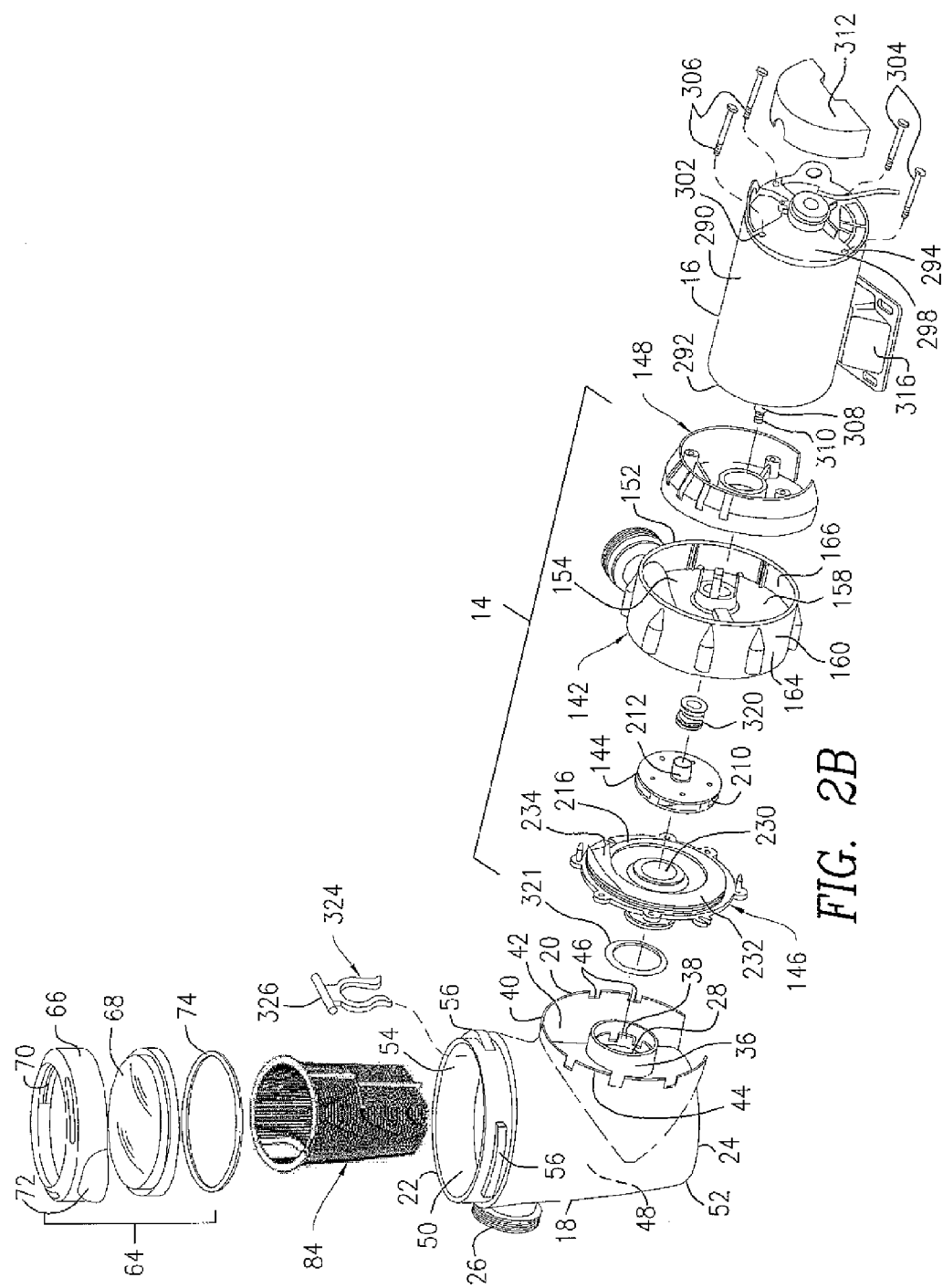
FIG. 2B is an exploded rear perspective view of the pump shown in FIG. 1.

Referring to FIGS. 1, 2A and 2B, a pump 10 includes a strainer housing 12, a pump housing assembly 14 connected to the strainer housing 12, and a cylindrical-shaped electrical motor 16 connected to the pump housing assembly 14 such that the pump housing assembly 14 is positioned between the strainer housing 12 and the motor 16. The features and functions of the strainer housing 12, the pump housing assembly 14, and the motor 16 shall be described in greater detail hereinafter.

Referring to FIGS. 1, 2A and 2B, the strainer housing 12 includes a front end 18, a rear end 20 opposite the front end 18, a top end 22, and a bottom end 24 opposite the top end 22. A circular-shaped inlet 26 is formed at the front end 18 of the strainer housing 12 proximate to the top end 22 thereof, while a circular-shaped outlet 28 is formed at the rear end 20 of the strainer housing 12 proximate to the bottom end 24 thereof (not shown in FIG. 2A, but see FIG. 2B). The inlet 26 includes an annular flanged projection 30 having a set of internal threads 32 and a set of external threads 34, whose function shall be described hereinafter. The outlet 28 includes an annular collar 36 having an array of rectangular-shaped locking members 38 (not shown in FIG. 2A, but see FIG. 2B), whose function shall be described hereinafter.

Figure 7A:
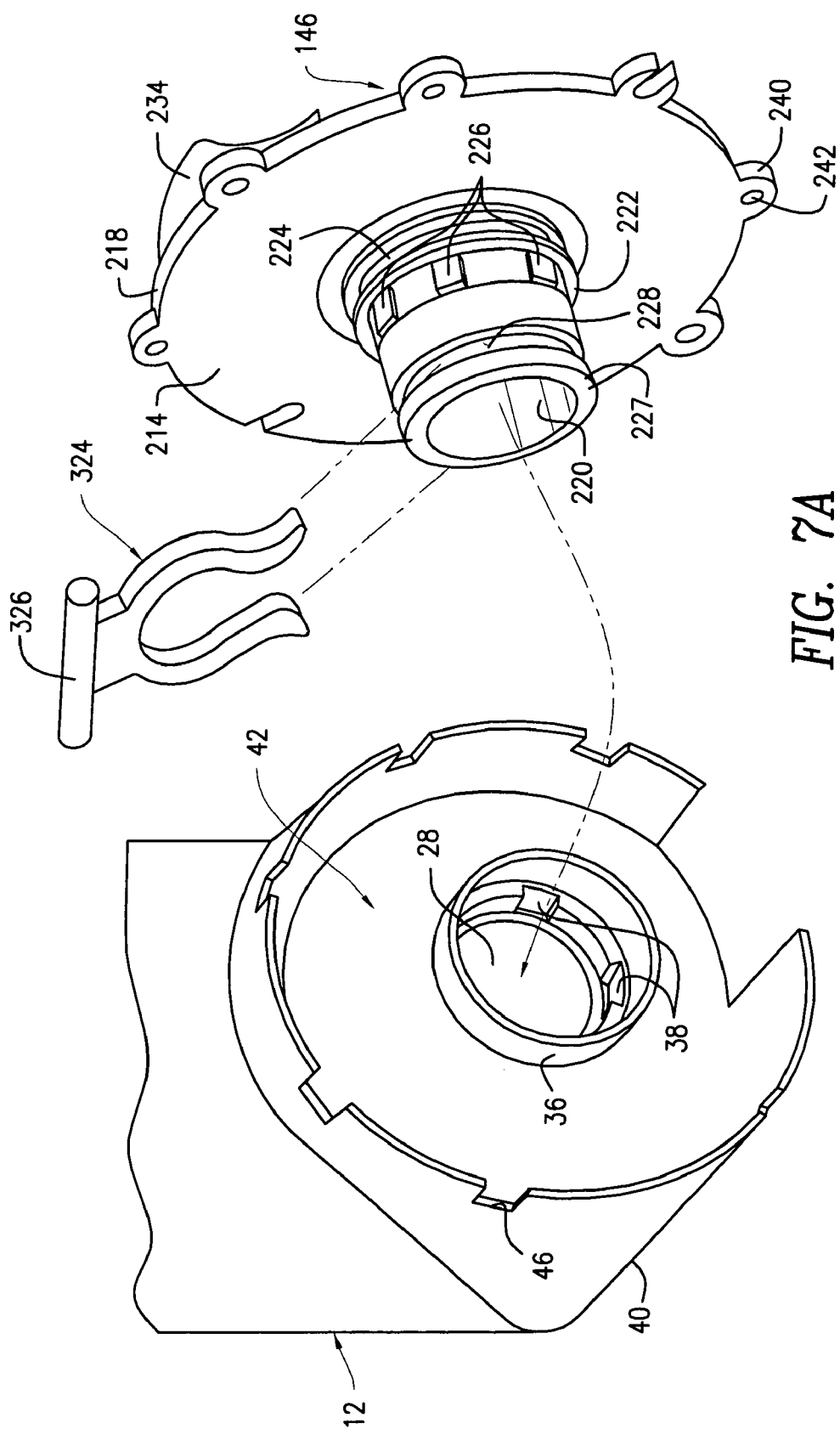
FIG. 7A is a rear perspective view of a strainer basket and a front perspective view of a corresponding casing cover employed by the pump shown in FIG. 2B.

Referring to FIGS. 2A, 2B, and 7A, the strainer housing 12 further includes a substantially cylindrical-shaped skirt 40 that protrudes from the rear end 20 of the strainer housing 12 and at least partially encircles the outlet 28 (see FIG. 2B). The skirt 40 defines an open area 42 which allows for the removable connection of various pump components, which will be discussed hereinafter. The skirt 40 includes a peripheral edge 44 having an array of notches 46, whose function shall be described hereinafter.

Figure 7B:
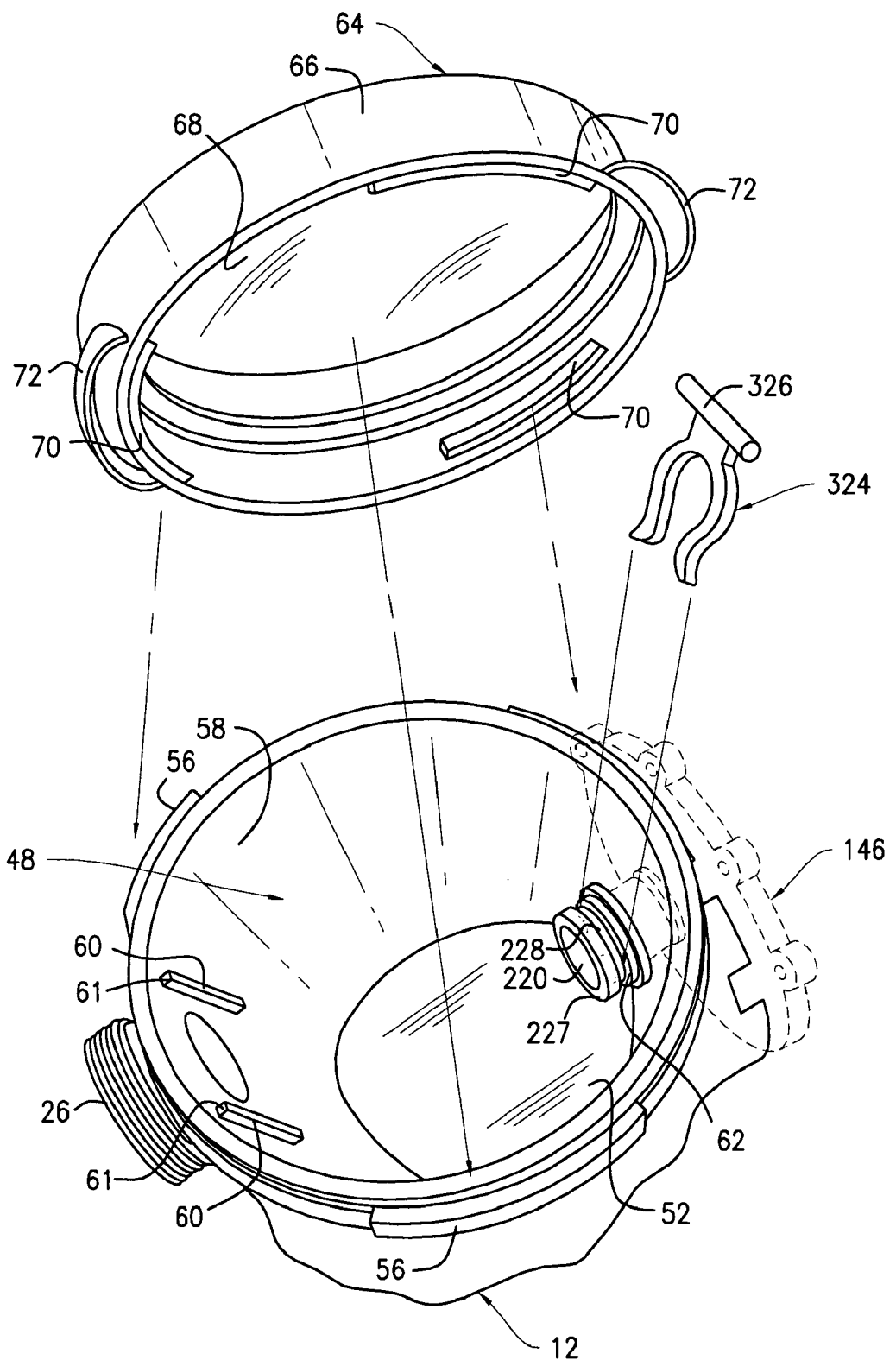
FIG. 7B is a top perspective view of a portion of a strainer basket and a bottom perspective view of an associated cover employed by the pump of FIG. 2B.

Referring to FIGS. 2A, 2B and 7B, the strainer housing 12 further includes a substantially cylindrical-shaped strainer chamber 48 that communicates with the inlet 26 and the outlet 28. The strainer chamber 48 includes a circular-shaped opening 50 located at the top end 22 of the strainer housing 12 and a gibbous-shaped bottom 52 located at the bottom end 24 of the strainer housing 12 (see FIG. 7B). The opening 50 is defined by a cylindrical-shaped projection 54, which extends upwardly from the strainer housing 12 and which includes a plurality of locking members 56 formed thereon in an annular fashion. As a result of this configuration, an inner surface 58 of the front end 18 of the strainer chamber 48 tapers from the opening 50 to the bottom 52 thereof, the purpose of which shall be described hereinafter. The inner surface 58 of the strainer chamber 48 includes a pair of elongated projections 60 extending longitudinally and radially inward therefrom, each one having an end 61 positioned proximate to the opening 50 (not shown in FIGS. 2A and 2B, but see FIG. 7B). The projections 60 are positioned parallel to each other and on opposite sides of the inlet 26 (see FIG. 7B). The inner surface 58 of the strainer chamber 48 further includes a circular-shaped projection 62 that encircles the outlet 28 (not shown in FIGS. 2A and 2B, but see FIG. 7B). The functions of the elongated projections 60 and the circular-shaped projection 62 shall be described hereinafter.

Referring to FIGS. 1, 2A, 2B and 7B, a cover 64 closes off the strainer opening 50 in a fluid-tight manner. The cover 64 includes a cover lock ring 66 and a lid 68 connected to the cover lock ring 66. The lid 68 is preferably made from a transparent material, but it can be made from an opaque material. The cover lock ring 66 is removably mounted to the strainer housing 12 for securing the cover 64 to the cylindrical projection 54. In this regard, the cover lock ring 66 includes an annular array of locking members 70 that are sized and shaped so as to releasably interlock with the locking members 56 of the cylindrical projection 54 in a bayonet fashion (not shown in FIG. 1, but see FIGS. 2A, 2B and 7B). The cover lock ring 66 also includes a pair of diametrically opposed handles 72 to facilitate the installation and removal of the cover 64 on and from the cylindrical projection 54. An O-ring 74 is mounted between the cover 64 and the cylindrical projection 54 to provide a fluid-tight seal therebetween (not shown in FIGS. 1 and 7B, but see FIGS. 2A and 2B).

Referring to FIG. 2A, a drain hole 76 having a set of internal threads 78 is formed at the front end 18 of the strainer housing 12 proximate to the bottom end 24 thereof and in communication with the strainer chamber 48. A plug 80, having a set of external threads 82 that threadedly engage the internal threads 78 of the drain hole 76, is sized and shaped to plug the drain hole 76 in a fluid-tight manner.

Referring to FIGS. 2A, 2B and 3A through 3D, the pump 10 further includes a substantially cylindrical-shaped strainer basket 84 that is removably installed within the strainer chamber 48 of the strainer housing 12. The basket 84 includes a front side 86, a rear side 88 opposite the front side 86, a top end 90 and a bottom end 92 opposite the top end 90. The basket 84 includes a circular-shaped opening 94 formed at the top end 90 thereof and having a flange 96, and a gibbous-shaped base 98 located at the bottom end 92 of the basket 84. As a result of this configuration, the front side 86 of the basket 84 tapers from the top end 90 to the bottom end 82 (see, in particular, FIGS. 3A and 3D), the purpose of which shall be described hereinafter.

Referring to FIGS. 3A through 3D, the basket 84 further includes a series of circumferential ribs 100 (i.e., lateral) that are spaced apart in parallel fashion from the top end 90 to the bottom end 92 of the basket 84, and which form an outer surface 102 of the basket 84, and a series of spaced apart longitudinal ribs 104 that extend from the top end 90 to the bottom end 92 of the basket 84, and which form an inner surface 106 of the basket 84 The circumferential ribs 100 and the longitudinal ribs 104 intersect perpendicularly with each other to form a plurality of rectangular-shaped perforations 108. Because the front side 86 of the basket 84 tapers from the top end 90 to the bottom end 92, the perforations 108 located proximate to the front side 86 of the basket 84 gradually decrease in size from the top end 90 to the bottom end 92 thereof (see, in particular, FIG. 3A).

Figure 3A:
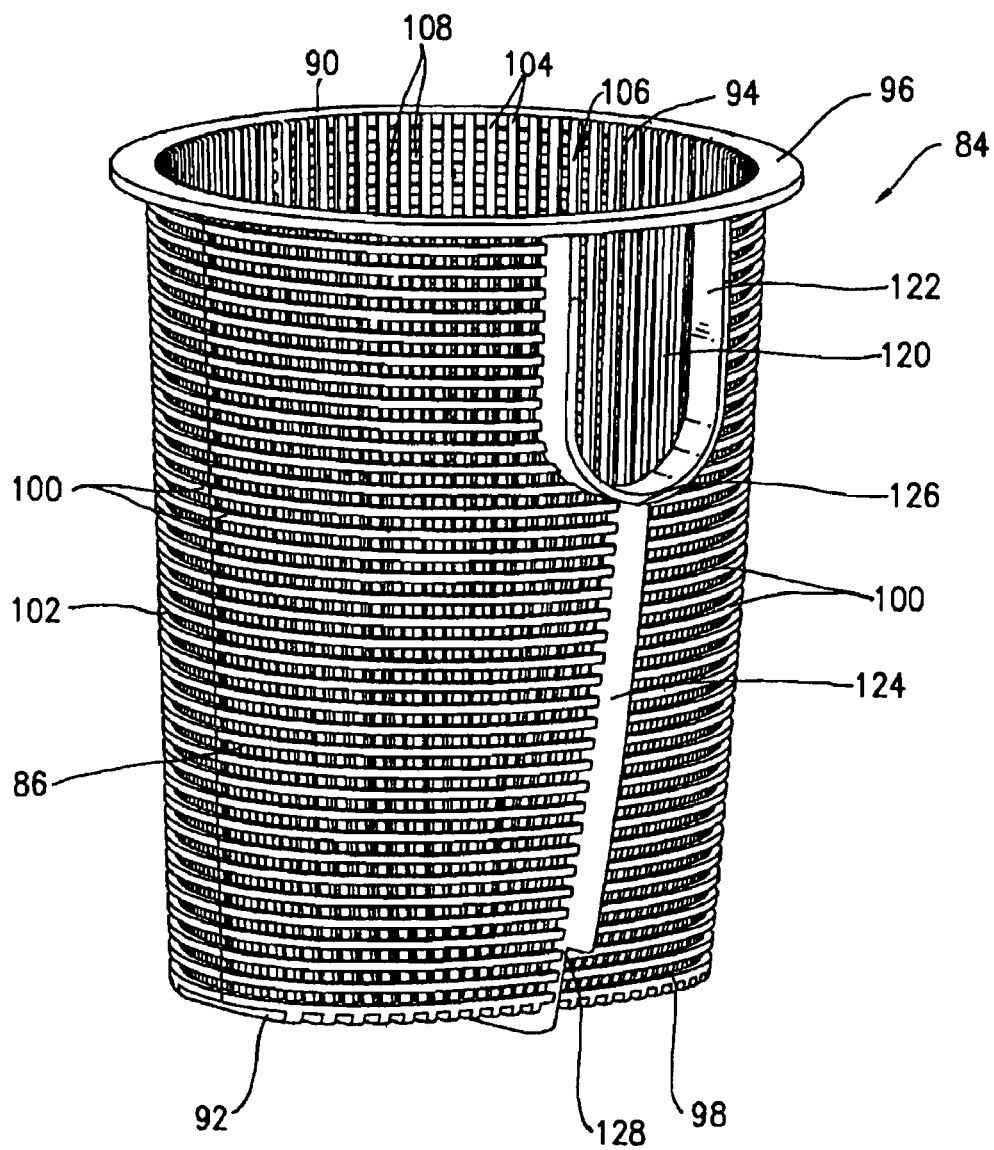
FIG. 3A is a rear perspective view of a strainer basket employed by the pump shown in FIG. 1.
Figure 3B:
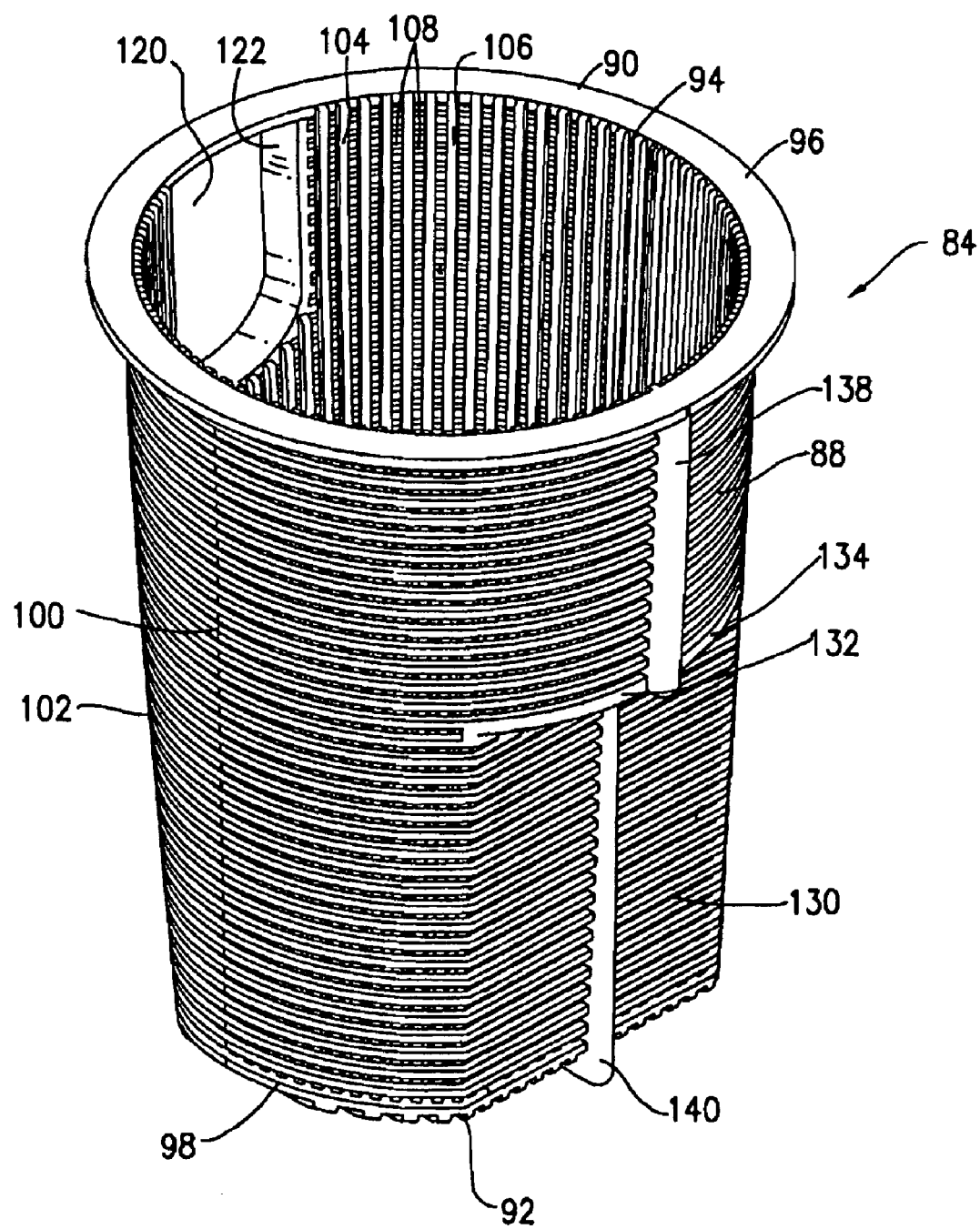
FIG. 3B is a front perspective view of the strainer basket shown in FIG. 3A.
Figure 3C:
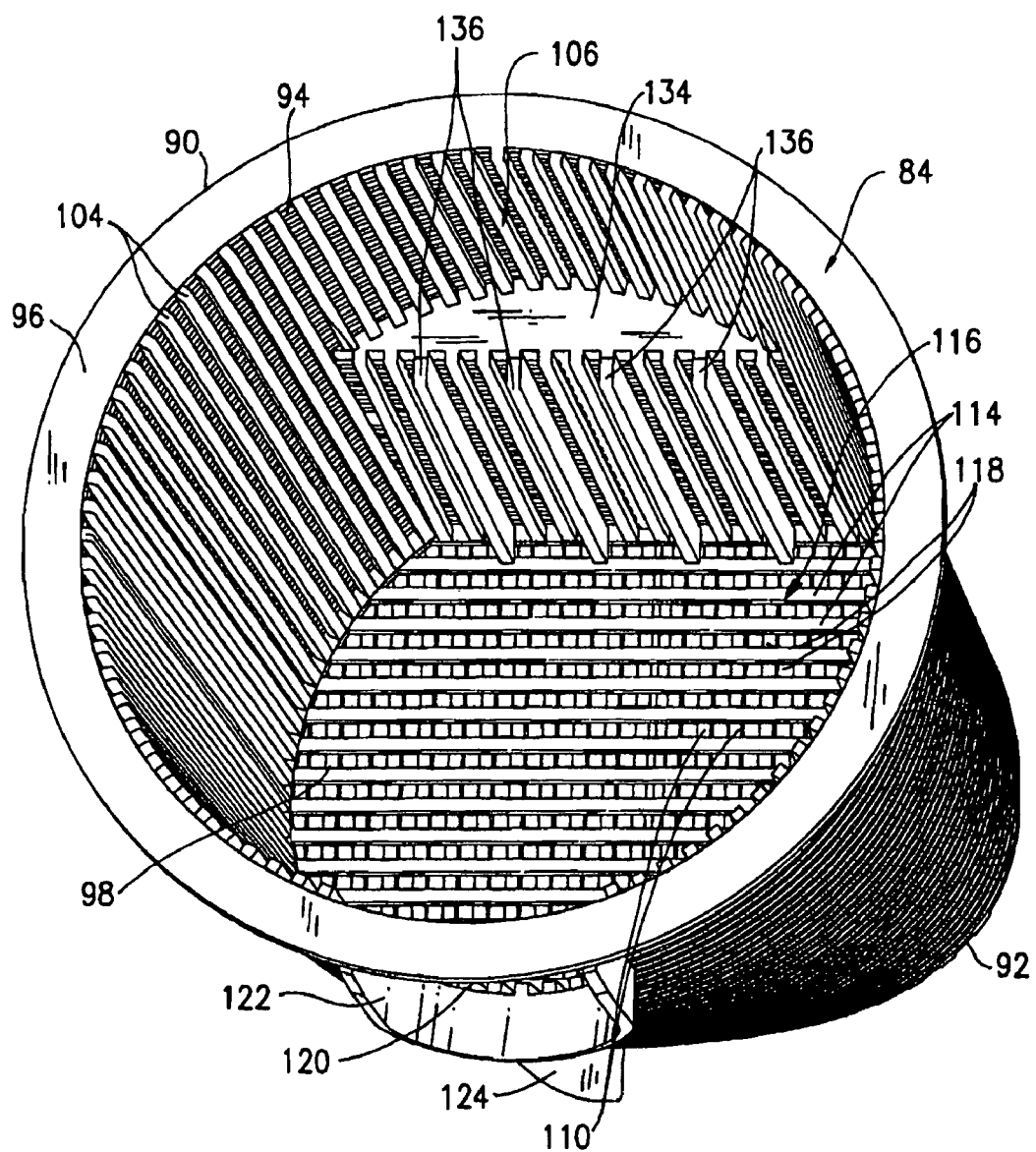
FIG. 3C is a top perspective view of the strainer basket shown in FIG. 3A.

Referring to FIG. 3C, the base 98 of the basket 84 includes a series of spaced-apart parallel ribs 110 that extend from the front side 86 to the rear side 88 of the basket 84, and which form an outer surface 112 of the base 98, and a series of parallel spaced apart ribs 114 that extend perpendicularly to the series of ribs 110 and form an inner surface 116 of the base 98. The ribs 110 intersect with the ribs 114 so as to form a plurality of perforations 118.

Referring back to FIGS. 3A through 3D, an U-shaped inlet 120 is formed at the front side 86 of the basket 84 proximate to the top end 90 thereof. On the front side 86 of the basket 84, an U-shaped fin 122 extends outwardly from the outer surface 102 surrounding the inlet 120, while an elongated fin 124 extends outwardly from the outer surface 102 from a bottom point 126 of the U-shaped fin 122 to a point 128 located proximate to the bottom end 92 of the basket 84 (see, in particular, FIGS. 3A and 3D).

Figure 3D:
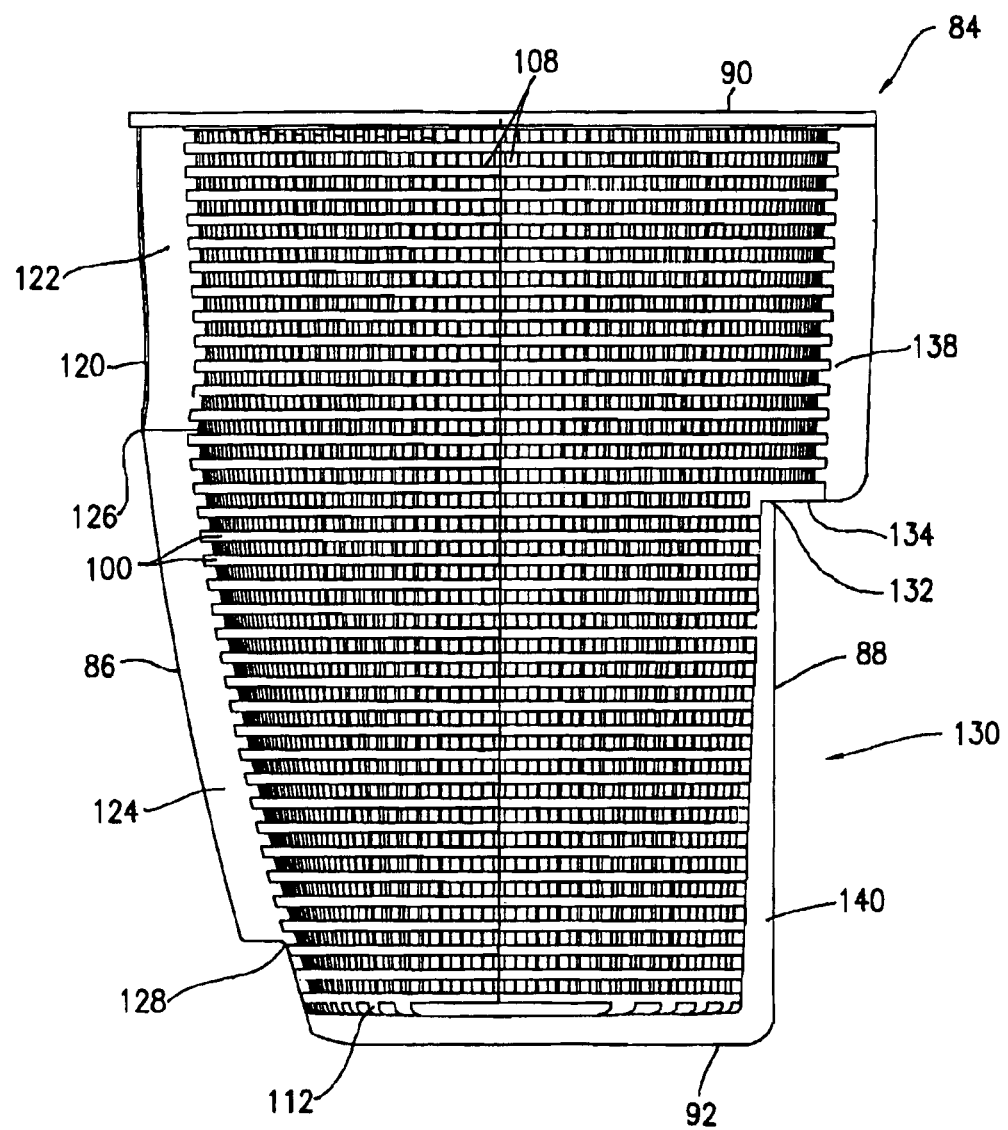
FIG. 3D is a side elevational view of the strainer basket shown in FIG. 3A.
Figure 4A:
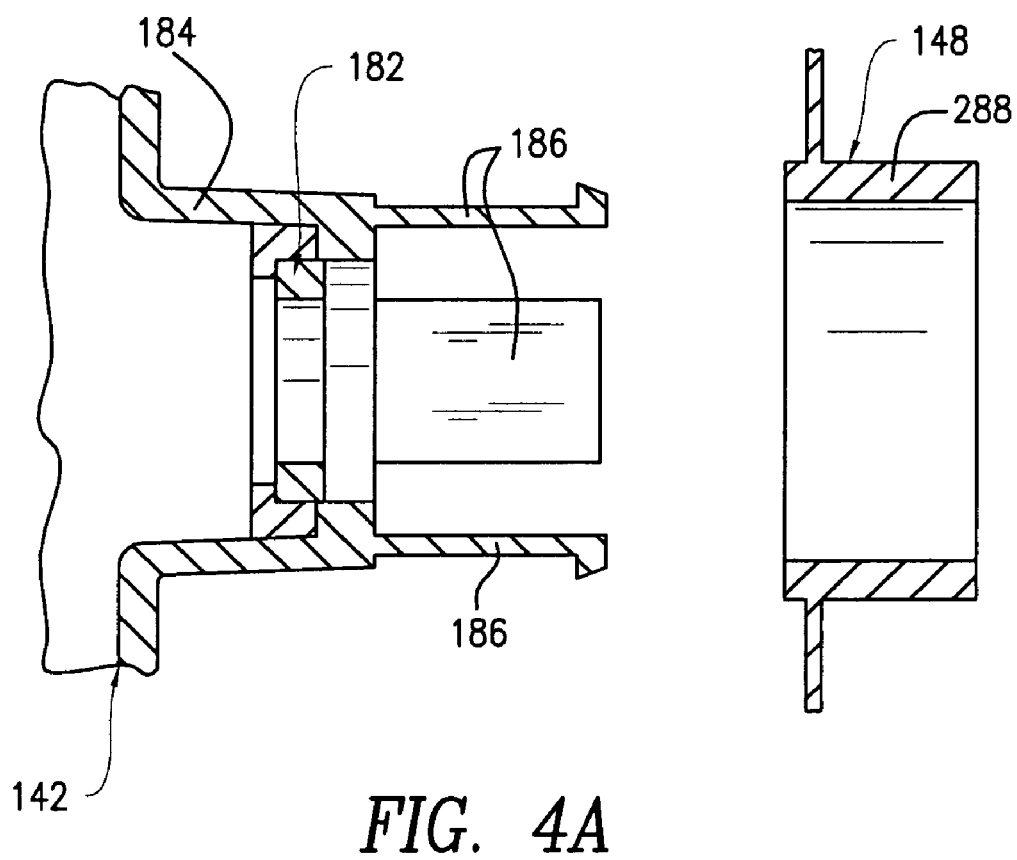
FIGS. 4A, B and C are sequential cross-sectional views, taken along section lines A-A and looking in the direction of the arrows, showing a portion of a casing being fastened to a portion of a motor lock ring shown in FIGS. 5A and 5B.
Figure 4C:
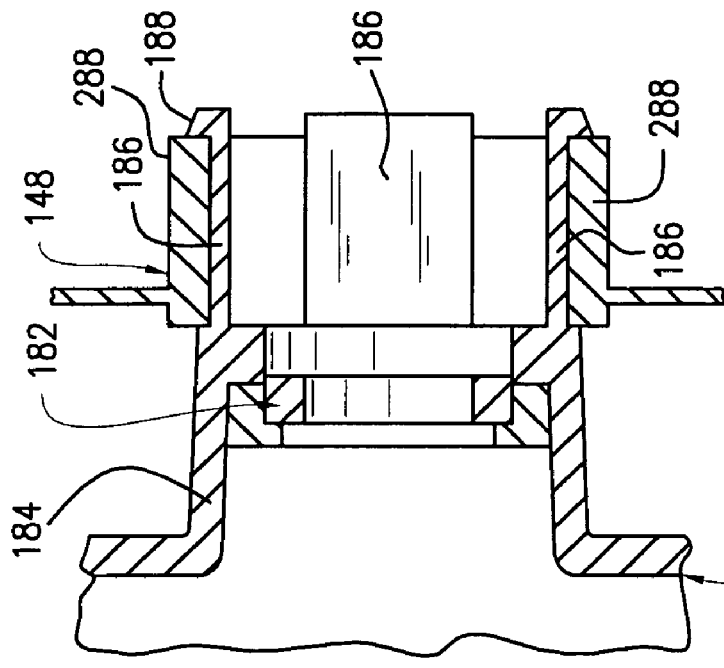
Figure 4B:
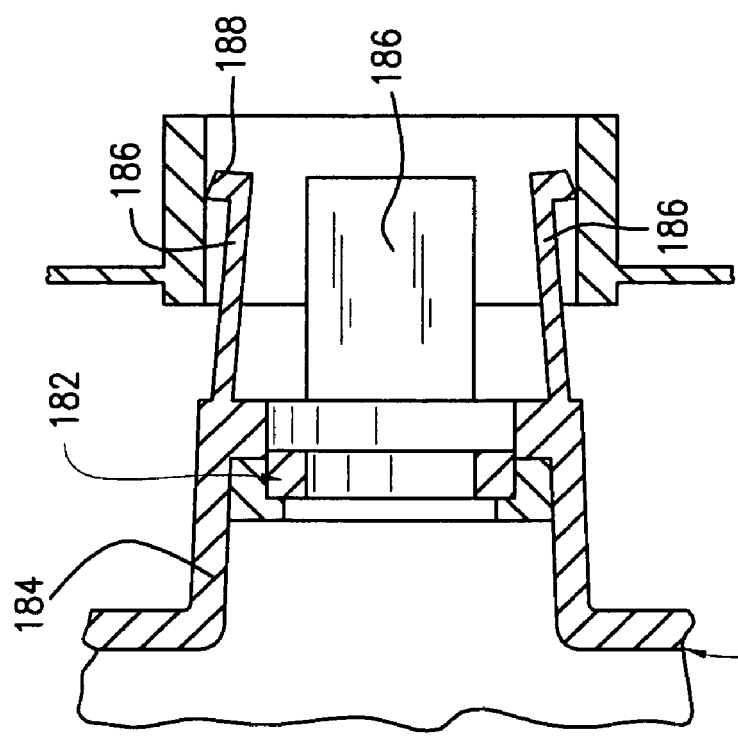

Referring to FIGS. 3B through 3D, the rear side 90 of the basket 84 contains a rectangular-shaped depression 130 that extends from the bottom end 92 of the basket 84 to a top point 132 intermediate the top and bottom ends 90, 92 of the basket 84. As a result, an arc-shaped overhang 134 is formed on the rear side 88 of the basket 84. The inner surface 106 of the basket 84 includes a plurality of parallel spaced-apart fins 136 that extend from the top 132 of the depression 130 to the base 98 of the basket 84. On the rear side 88 of the basket 84, an elongated fin 138 projects outwardly extending longitudinally from the top end 90 to the overhang 134, while an elongated fin 140 projects outwardly from the outer surface 102 extending longitudinally from the overhang 134 to the bottom end 92 of the basket 84 and continuing to extend from the outer surface 112 on the base 98 of the basket 84 from the rear side 88 to the front side 86.

Referring back to FIGS. 2A and 2B, the pump housing assembly 14 includes a volute casing 142, a closed impeller 144 housed within the casing 142, a casing cover 146 mounted to the casing 142, and a motor lock ring 148 connected to the casing 142 and to the motor 16 such that motor lock ring 148 is positioned between the casing 142 and the motor 16. The features and functions of the casing 142, the impeller 144, the casing cover 146, and the motor lock ring 148 shall be described in greater detail hereinafter.

Referring to FIGS. 2A, 2B, 4A, 4B, 4C, 5A and 5C, the casing 142, which has a unitary construction, includes a front end 150, a rear end 152 opposite the front end 150, a volute-shaped plate 154 having a first surface 156 and a second surface 158 opposite the first surface 156 and positioned intermediate the front and rear ends 150, 152, and a cylindrical-shaped wall 160 that encircles the plate 154 and extends from the front end 150 to the rear end 152. The wall 160 includes an outer surface 162 that extends between the front and rear ends 150,152, a first inner surface 164 that extends from the first surface 156 of the plate 154 to the front end 150, and a second inner surface 166 that extends partially from the second surface 158 of the plate 154 to the rear end 152. The first surface 156 of the plate 154, the first inner surface 164 of the wall 160, and the casing cover 146 form a fluid chamber 168, the function of which shall be described hereinafter.

Still referring to FIGS. 2A, 2B, 5A and 5C, a circular-shaped outlet 170 is formed at the outer surface 162 of the wall 160. The outlet 170 includes an annular flanged projection 172 that extends tangentially from the outer surface 162 of the wall 160 and is in communication with the fluid chamber 168. The outlet 170 includes a set of internal threads 174 and a set of external threads 176, whose function shall be described hereinafter.

Referring to FIGS. 2B, 4A-4C, and 5A, an arc-shaped channel 178 is formed within the first surface 156 of the plate 154 and extends outwardly from the second surface 158 of the plate 154. The channel 178 is in communication with the outlet 170, the purpose of which shall be described hereinafter. A centrally located circular-shaped aperture 180 extends from the first surface 156 to the second surface 158 of the plate 154. A bushing assembly 182 of a type known in the art is mounted within the aperture 180. A centrally located annular collar 184 extends axially from the second surface 158 of the plate 154 and encircles the aperture 180. The collar 184 contains an annular array of locking members 186 that extends axially therefrom. Each of the locking members 186 contains a locking tab 188, whose function shall be described hereinafter. Preferably, the casing 142 includes the four locking members 186 (i.e., two diametrically opposed pairs as shown in the FIGS.), but it may include a greater or lesser number than four.

Figure 5A:
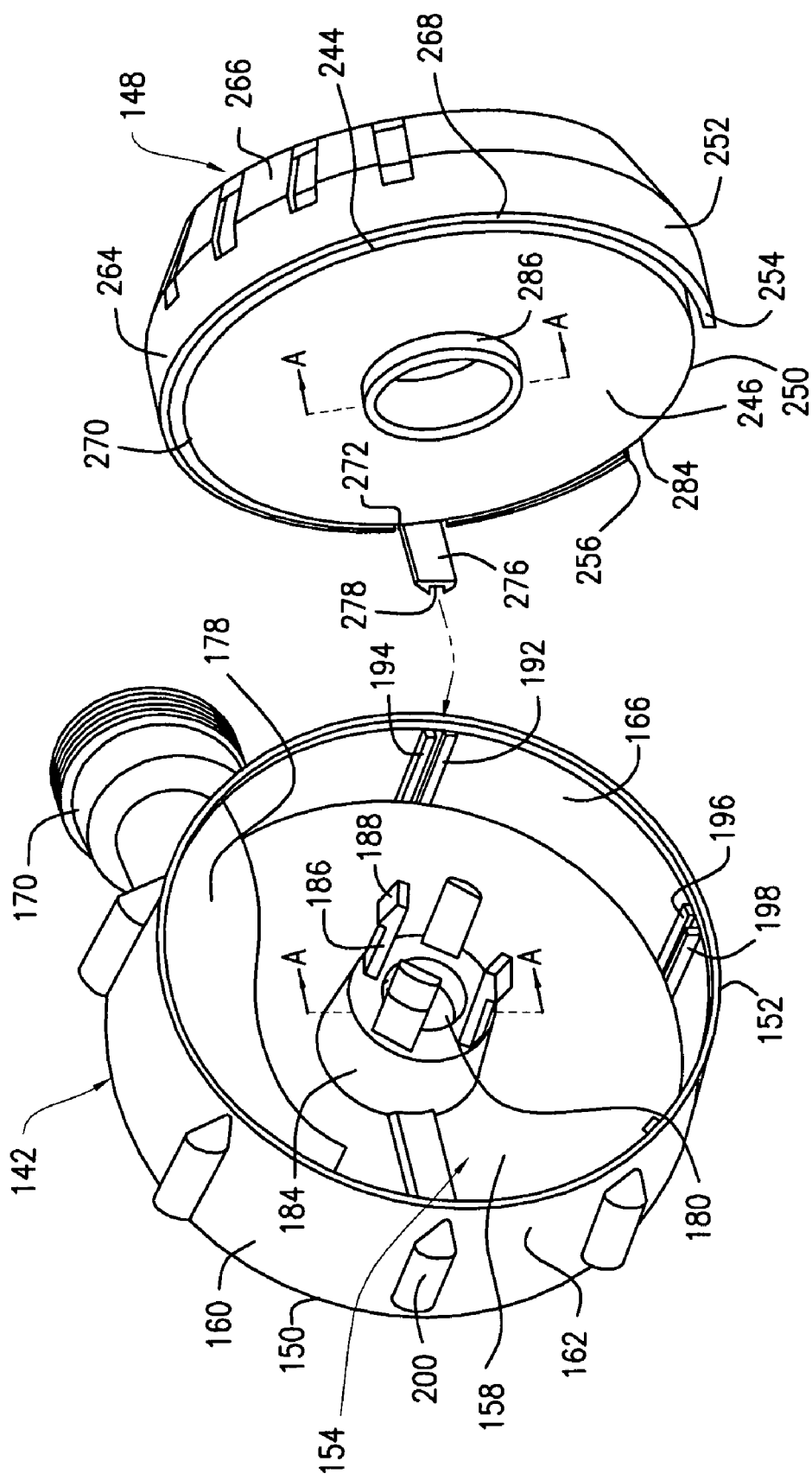
FIG. 5A is a rear perspective view of a casing and a front perspective view of a corresponding motor lock ring employed by the pump of FIG. 2B, showing an outlet of the casing in a horizontal position.
Figure 5B:
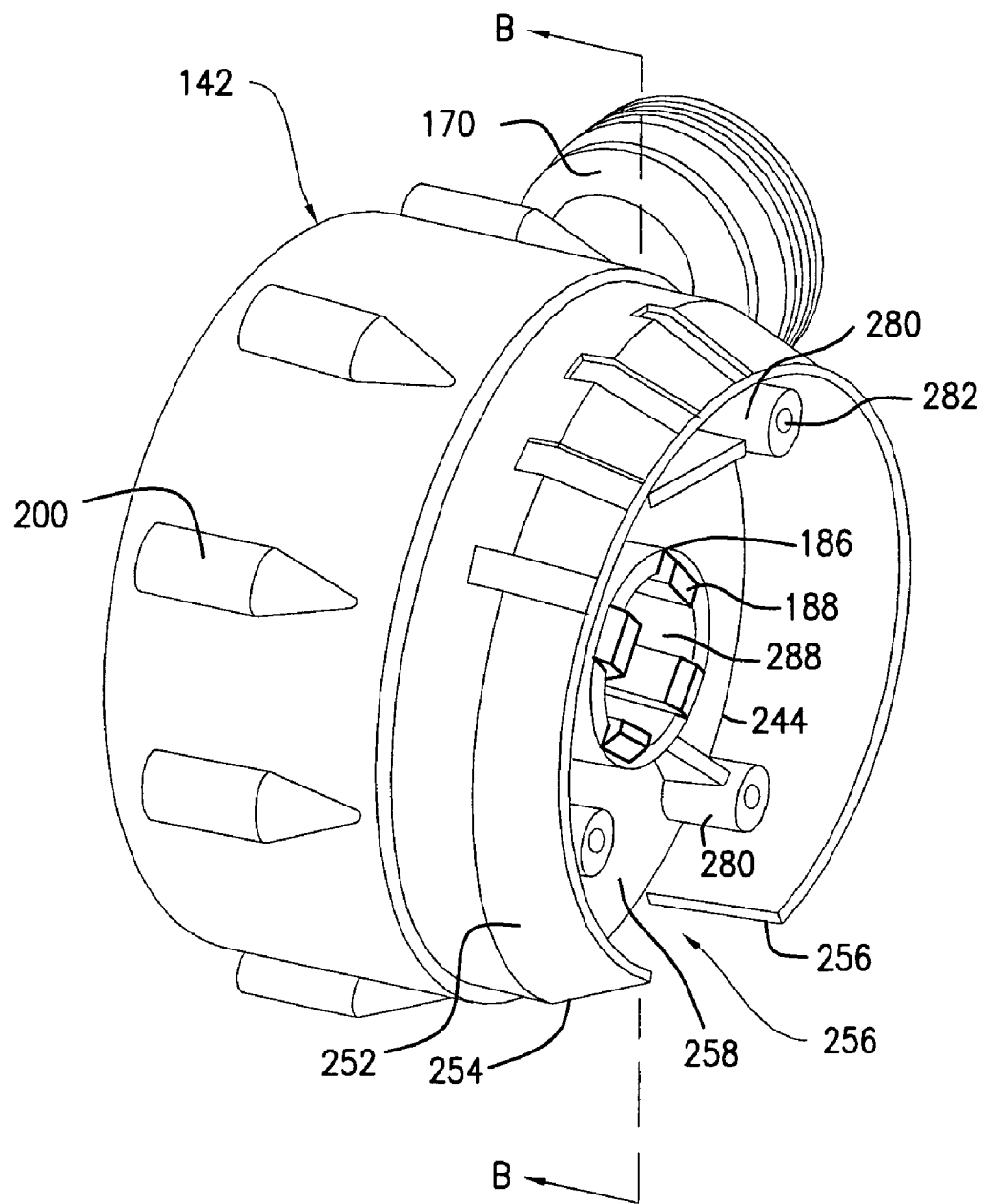
FIG. 5B is a rear perspective view of the motor lock ring attached to the casing of FIG. 5A.
Figure 5C:
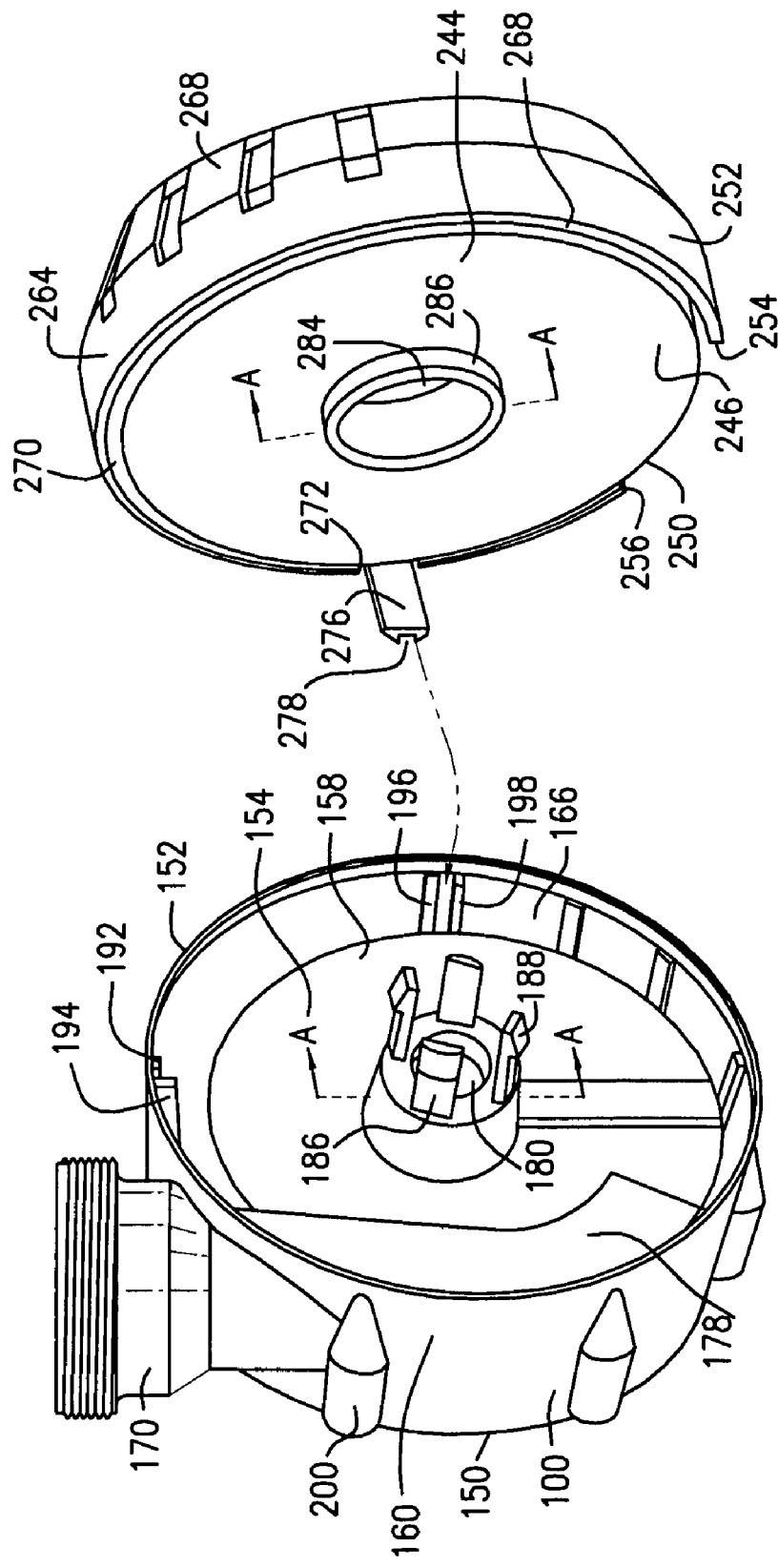
FIG. 5C is a rear perspective view of a casing and a front perspective view of a corresponding motor lock ring employed by the pump of FIG. 2B, showing an outlet of the casing in a vertical position.
Figure 6A:
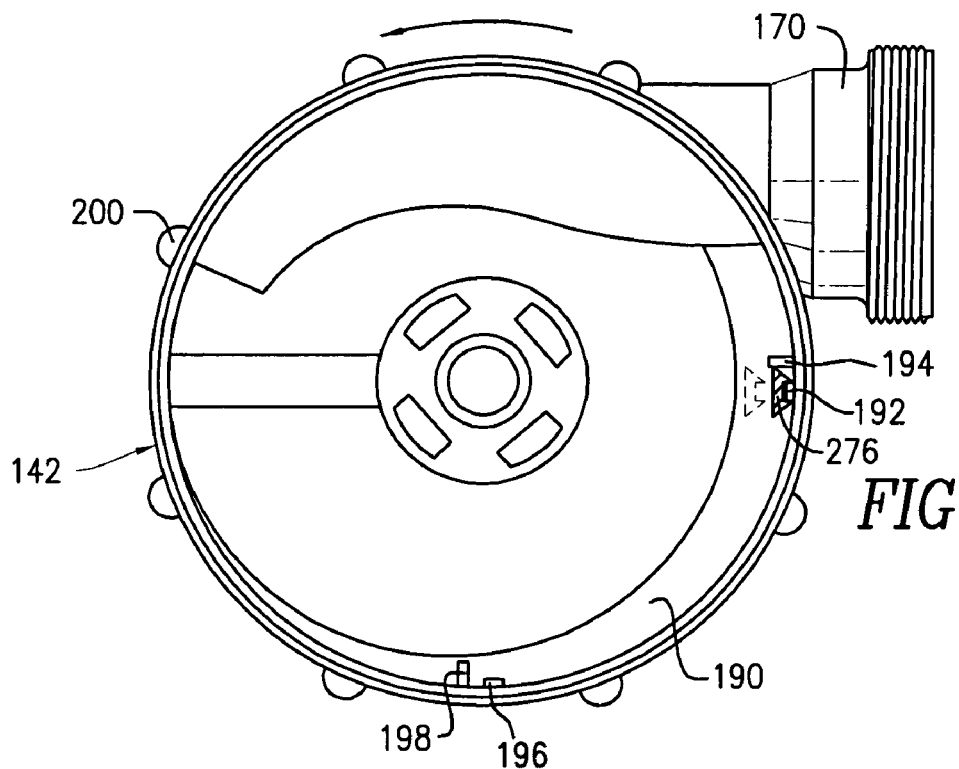
FIG. 6A is a cross-sectional view, taken along section line B-B and looking in the direction of the arrows, of the casing and the motor lock ring of FIG. 5B.
Figure 6B:
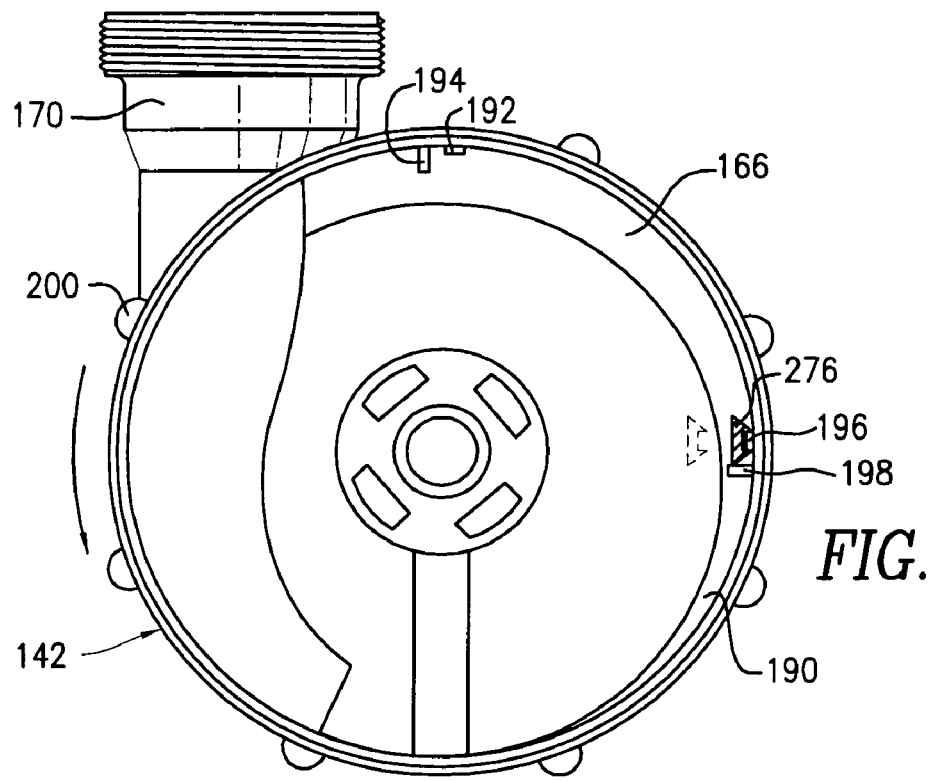
FIG. 6B is a cross-sectional view, taken along section line C-C and looking in the direction of the arrows, of the casing and the motor lock ring of FIG. 5D.

Referring to FIGS. 5A, 5C, 6A and 6B, an arc-shaped groove 190 is formed between the plate 154 and the second inner surface 166 of the wall 160 (not shown in FIGS. 5A and 5C, but see FIGS. 6A and 6B). An elongated first tab member 192 and an elongated first stop member 194 extend transversely on and inwardly from the second inner surface 166 of the wall 160 within the groove 190 and are positioned proximate to the outlet 170. The first stop member 194 is positioned closer to the outlet 170 than, and extends further inwardly than, the first tab member 192. An elongated second tab member 196 and an elongated second stop member 198 extend transversely on and inwardly from the second inner surface 166 of the wall 160 within the groove 190 and are positioned distal to the outlet 170. The second stop member 198 is positioned farther from the outlet 170 than, and extends further inwardly than, the second tab member 196. Preferably, the first tab member 192 and the first stop member 194 are positioned approximately 90 degrees from the second tab member 196 and the second stop member 198, but they may positioned at any distance from each other. Preferably, the casing 142 includes the first tab and first stop members 192, 194 and second tab and second stop members 196, 198 (i.e., two pairs of tab and stop members), but it may include a lesser or greater number. The functions of the first tab and first stop members 192, 194 and the second tab and second stop members 196, 198 shall be described hereinafter.

Referring to FIG. 2A, a plurality of spaced apart cylindrical-shaped members 200 extend transversely on the outer surface 162 of the wall 160. Each of the members 200 has a threaded hole 202 extending axially therein. A plurality of spaced apart notches 204 are formed at a peripheral edge 206 of the wall 160 at the front end 150. One of the plurality of notches 204 is positioned adjacent to a corresponding one of the plurality of members 200. Preferably, the casing 142 includes the seven members 200 and the seven notches 204, but it may include a greater or lesser number than seven for each. The functions of the members 200 and the notches 204 shall be described hereinafter.

Preferably, the casing 142 is characterized by a volute-type design. However, the casing 142 may be characterized by other types of designs that are known in the art, such as, for example, a circular casing design (not shown in the Figures).

Referring to FIGS. 2A and 2B, the impeller 144 includes a circular-shaped eye 208 for receiving fluid and a plurality of channels 210 therein for discharging high-velocity fluid. The impeller 144 includes a centrally located threaded hub 212, whose function shall be described hereinafter. The impeller 144 is housed within the casing 142 in a manner to be described hereinafter. Preferably, the pump 10 includes the impeller 144, which has a closed design (see FIGS. 2A and 2B). However, the impeller 144 may be characterized by other designs for impellers that are known in the art, such as, for example, an open design or a semi-open design (not shown in the Figures).

Referring to FIGS. 2A, 2B and 7A, the cover 146, which has a unitary construction, includes a first surface 214 and second surface 216 opposite the first surface 216, and a peripheral edge 218. A centrally located inlet 220 extends from the first surface 214 to the second surface 216 of the cover 146. The inlet 220 includes an annular flanged projection 222 having a first annular groove 224 positioned proximate to the first surface 214 of the cover 146, an annular array of locking members 226 positioned adjacent to the groove 224, a flange 227, and a second annular groove 228 positioned distal from the first surface 216 of the cover 146 such that the locking members 226 are positioned intermediate the first and second annular grooves 224, 228. The functions of the first and second annular grooves 224, 228 and the locking members 226 shall be described hereinafter.

Still referring to FIGS. 2A, 2B and 7A, a centrally located outlet 230 is formed at the second surface 216 of the cover 146 and is in communication with the inlet 220. A volute-shaped member 232, which extends outwardly from the second surface 216 of the cover 146 and encircles the outlet 230, includes an arc-shaped incline 234 that is sized and shaped to correspond with the channel 178 of the casing 142, thus forming a fluid path into the outlet 170 of the casing 142. The member 232 contains an annular groove 236 that is sized and shaped to receive an O-ring 238, which provides a fluid-tight seal between the casing cover 146 and the casing 142.

Still referring to FIGS. 2A, 2B and 7A, an annular array of tabs 240 extends radially along the peripheral edge 218 of the cover 146. Each of the tabs 240 includes a hole 242, whose function shall be described hereinafter. Preferably, the cover 146 includes the seven tabs 240, but it may include a greater or lesser number than seven.

Referring to FIGS. 2A, 2B and 5A through 5D, the motor lock ring 148, which has a unitary construction, includes a circular-shaped plate 244 having a first surface 246, a second surface 248 opposite the first surface 246, a peripheral edge 250, and a substantially circular-shaped wall 252 extending from the first surface 246 of the plate 244 at the peripheral edge 250. The wall 252 begins on the peripheral edge 250 of the plate 244 at a first end 254 and terminates on the peripheral edge 250 at a second end 256, resulting in an arc-shaped opening 258 formed between the first and second ends 254, 256. The wall 252 further includes an inner surface 260, an outer surface 262 opposite the inner surface 260, an annular first section 264 extending directly from the first surface 246 of the plate 244, and an annular second section 266 extending from the first section 264 that tapers inwardly. The first section of 264 of the wall 252 includes an overhang 268 that extends radially from the peripheral edge 250 of the plate 244 from the first end 254 to the second end 256 of the wall 252. A plurality of arc-shaped grooves 270 are formed between the peripheral edge 250 of the plate 244 and the inner surface 260 of the wall 252, whose function shall be described hereinafter.

Figure 5D:
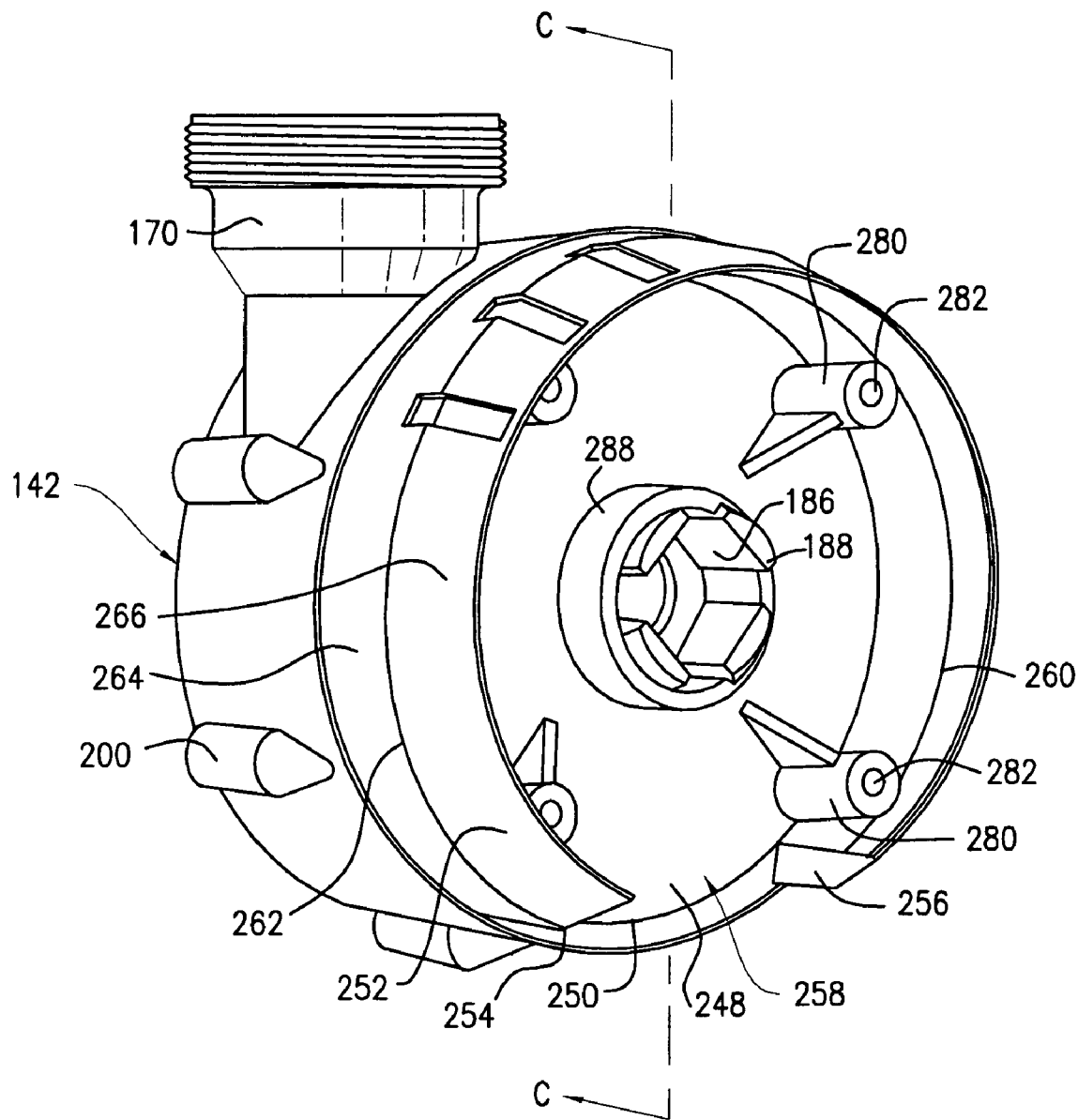
FIG. 5D is a rear perspective view of the motor lock ring attached to the casing of FIG. 5C.

Referring to FIGS. 2A, 5A and 5D, the first section 264 of the wall 252 includes a rectangular-shaped notch 272 and a rectangular-shaped button 274 having a latch 276 that extends transversely along the first section 264 of the wall 252, beyond the peripheral edge 250 of the plate 244, and within the notch 272. The latch 276, which has a trapezoidal prism shape, includes a notch 278. The notch 272 and the button 274, whose functions shall be described hereinafter, are preferably positioned on the wall 252 at approximately 90 degrees from the center of the opening 258, but they may be positioned in other locations on the wall 252.

Referring to FIGS. 2A, 2B, and 5A through 5D, the motor lock ring 148 further includes an annular array of cylindrical-shaped posts 280 which extend from the second surface 248 of the plate 244 and are positioned adjacent to the inner surface 260 of the wall 252. Each of the posts 280 includes a threaded hole 282, whose function shall be described hereinafter. Preferably, the motor lock ring 148 includes the four posts 280 (i.e., the two pairs of diametrically opposed posts 280), but may include a greater or lesser number than four.

Still referring to FIGS. 2A, 2B and 5A through 5D, the motor lock ring 126 further includes a centrally located, circular-shaped aperture 284 that extends from the first surface 246 to the second surface 248 of the plate 244. A first collar 286 extends outwardly from the first surface 246 of the plate 244 and encircles the aperture 284, while a second collar 288 extends outwardly from the second surface 248 of the plate 244 and encircles the aperture 284. The functions of the first and second collars 286, 288 shall be described hereinafter.

Referring to FIGS. 2A and 2B, the motor 16 includes a housing 290 having a first end 292 and a second end 294 opposite thereof. A circular-shaped first cover plate 296 is mounted to the first end 292 of the housing 290, while a circular-shaped second cover plate 298 is mounted to the second end 294 of the housing 290. The first cover plate 296 includes an annular array of holes 300, while the second cover plate 298 includes an annular array of holes 302. Each of the holes 300 of the first cover plate 296 corresponds and is aligned with one of the holes 302 of the second cover plate 298. Each of the pair of corresponding holes 300, 302 is sized and shaped to receive a corresponding motor through bolt 304 having a threaded end 306, whose function shall be described hereinafter.

Still referring to FIGS. 2A and 2B, the motor 16 further includes a shaft 308 that is centrally and axially positioned and rotatably mounted within the housing 290. The shaft 308 includes a threaded end 310 that protrudes from the first end 292 of the housing 290. The motor 16 includes a canopy 312 removably fastened to the second cover plate 298. The canopy 312 includes a power switch 314 that is connected electrically to the motor 16. Alternatively, the canopy 312 need not be included. A cradle 316 is fastened to a lower end 318 of the housing 290 of the motor 16 to provide stability and mounting therefor. The motor 16 may be obtained from A.O. Smith Electrical Products Company of Tipp City, Ohio, Model No.

7-193389-20. Alternatively, the motor 16 can be supplied by other manufacturers and/or be characterized by other model numbers.

Preferably, the inlet 26 and outlet 28 of the strainer housing 12 and the outlet 170 of the casing 142 are circular in shape, but each can consist of other shapes and sizes. Also, the opening 50 of the strainer housing 12 is preferably circular in shape, while the bottom 52 of the strainer housing 12 is preferably gibbous in shape, but each can consist of other shapes and sizes. Similarly, the opening 94 of the basket 84 is preferably circular in shaped, while the base 98 of the basket 84 is preferably gibbous in shape, but each one can consist of other shapes and sizes. For instance, the overall shape of the chamber 48 of the strainer housing 12 can be cylindrical, conical, etc., while the basket 84 may have a corresponding size and shape.

Referring to FIGS. 2A and 2B, the pump 10 is assembled in the following manner. First, the motor lock ring 148 is mounted to the first end 292 of the housing 290 of the motor 16, whereby the shaft 308 of the motor 16 is inserted into the aperture 284 of the motor lock ring 148 and the second section 266 of the wall 252 is coupled frictionally to the first end 292 of the housing 290 of the motor 16. Because the second section 266 of the wall 252 of the motor lock ring 148 tapers inwardly, very little space exists between the wall 252 and the first end 292 of the housing 290, thereby shielding the first end 292 of the housing 290 from foreign objects. Each of the threaded holes 282 of the posts 280 of the motor lock ring 148 is aligned with a corresponding one of the holes 300 of the first motor cover plate 296, which, in turn, is aligned with a corresponding one of the holes 302 of the second motor plate 298. One of the bolts 304 is inserted within one of the holes 302 of the second motor cover plate 298, the corresponding hole 300 of the first motor cover plate 296, and the corresponding threaded hole 282 of the post 280 of the motor lock ring 148. In each instance, the threaded end 306 of the bolt 304 threadedly engages the threaded hole 282 of the post 280, thereby enabling the motor lock ring 148 to be removably fastened to the motor 16. It is noted that when the motor lock ring 148 is fully mounted on the motor 16, the opening of the wall 258 is positioned proximate to the lower end 318 of the housing 290 of the motor 16. The opening 258 allows a user to firmly grasp the motor lock ring 148 to facilitate removal thereof from the motor 16. Also, the button 274 of the motor lock ring 148 is, preferably, positioned approximately ninety degrees from the center of the opening 258, the reason for which shall be described hereinafter.

Referring to FIGS. 4A through 4C and 5A through 5D, the casing 142 is mounted to the motor lock ring 148. The locking members 186 of the casing 142 are inserted into the aperture 284 of the motor lock ring 148 and are flexed inwardly while passing through the second collar 288 of the motor lock ring 148. The locking tabs 188 of the locking members 186 then engage the second collar 288. The first collar 286 of the motor lock ring 148 acts as a spacer between the first surface 246 of the plate 244 of the motor lock ring 148 and the second surface 158 of the plate 154 of the casing 142. As a result, the casing 142 is rotatably fastened to the motor lock ring 148.

Next, a determination must be made as to whether the outlet 170 of the casing 142 should be positioned either vertically or horizontally, which will depend on the actual position of the return line of the fluid circulation system to be connected thereto (not shown in the Figures). If it is desired to position the outlet 170 vertically, i.e., the return line is positioned vertically, then the casing 142 is rotated in a direction so that the notch 278 of the latch 276 engages the second tab member 196 of the casing 142 (which is positioned distal to the outlet 170). In this regard, the notch 278 of the latch 276 and the second tab member 196 are each sized and shaped so that they releasably engage each other. The second stop member 198 prevents the latch 276 from bypassing the second tab member 196 when the casing 142 is rotated and aligns the notch 278 of the latch 276 with the second tab member 196 so as to ensure the engagement between the latch 276 and the second tab member 196. When the latch 276 and the second tab member 196 are engaged with each other, the casing 142 is positioned fixedly and hence the outlet 170 is positioned vertically. On the other hand, if it is desired to position the outlet 170 horizontally, i.e., the return line is positioned horizontally, then the casing 142 is rotated in a direction so that the notch 278 of the latch 276 engages the first tab member 192 of the casing 142 (which is positioned proximate to the outlet 170). In this regard, the notch 278 of the latch 276 and the first tab member 192 are each sized and shaped so that they releasably engage each other. The first stop member 194 prevents the latch 276 from bypassing the first tab member 192 when the casing 142 is rotated and aligns the notch 278 of the latch 276 with the first tab member 192 so as to ensure their engagement with each other. When the latch 276 and the first tab member 192 are engaged, the casing 142 is positioned fixedly and hence the outlet 170 is positioned horizontally.

If it is desired to switch the position of the outlet 170 from a vertical position to a horizontal position, then a user simply presses the button 274 of the motor lock ring 148 to release the latch 276 from the second tab member 196 of the casing 142, thereby enabling the casing 142 to be rotated until the latch 276 engages the first tab member 192 of the casing 142. The channel 270 provides a space directly below the latch 276 which provides clearance to allow the button 274 to be depressed. Similarly, if it is desired to switch the position of the outlet 170 from a horizontal position to a vertical position, then a user simply presses the button 274 of the motor lock ring 148 to release the latch 276 from the first tab member 192 of the casing 142, thereby enabling the casing 142 to be rotated until the latch 276 engages the second tab member 196 of the casing 142.

Preferably, the casing 142 includes the tab members 192, 196, which enable the outlet 170 of the casing 142 to be positioned vertically or horizontally. Alternatively, the casing 142 can include additional tab members positioned intermediate the tab members 192, 196, which would enable the outlet 170 to be positioned intermediate a vertical position or a horizontal position, e.g., diagonally at any angle (not shown in the Figures).

Referring to FIGS. 2A and 2B, the impeller 144 is fastened to the shaft 308 of the motor 16, whereby the hub 212 of the impeller 144 threadedly engages the threaded end 310 of the shaft 308, thereby enabling the impeller 144 to be removably fastened to the shaft 308. A shaft seal 320 known in the art is mounted between the impeller 144 and the shaft 308 to prevent the passage of fluid into the housing 290 of the motor 16.

Referring to FIGS. 2A and 2B, the cover 146 is mounted to the casing 142, whereby each of the tabs of 240 the cover 146 engage a corresponding one of the notches 204 of the casing 142 and hence each of the holes 242 of the tabs 240 aligns with one of the threaded holes 202 of the cylindrical members 200 of the casing 142. The corresponding holes 202, 242 are adapted to receive a screw 322, thereby enabling the cover 146 to be removably fastened to the casing 142. When the cover 146 is mounted to the casing 142, the incline 234 of the cover 146 is aligned and corresponds with the groove 190 of the casing 142 so as to form a fluid flow path into the outlet 170. The O-ring 238 provides a fluid-tight seal between the casing 142 and the cover 146.

Referring to FIGS. 2A, 2B, 7A and 7B, the strainer housing 12 is then mounted to pump housing assembly 14. In this regard, the annular flanged projection 222 of the casing cover 146 is inserted into the annular collar 36 of the strainer housing 12. The locking members 38 of the annular collar 36 and the locking members 226 of the annular flanged projection 222 of the casing cover 146 are sized and shaped to releasably engage each other. The tabs 240 of the casing cover 146 and the notches 46 of the skirt 40 of the strainer housing 12 are sized and shaped to engage each other, thereby preventing the strainer housing 12 from rotating relative to the pump housing assembly 14. The second annular groove 228 of the casing cover 146 is positioned within the chamber 48 of the strainer housing 12 proximate to the circular-shaped projection 62. An O-ring 321 mounted in the first annular groove 224 provides a fluid-tight seal between the strainer housing 48 and the casing cover 146.

Still referring to FIGS. 2A, 2B, 7A and 7B, a horseshoe-shaped clip 324 releasably fastens the strainer housing 12 to the pump housing assembly 14. In this regard, the clip 324 slides around the second annular groove 228 of the projection 222 of the casing cover 146 and is secured between the flange 227 of the casing cover 146 and the circular-shaped projection 62 of the strainer housing 12. The clip 324 includes a handle 326 which facilitates the installation and removal of the locking member to and from the projection 222 of the casing cover 146.

Referring to FIGS. 2A and 2B, the basket 84 is installed within the chamber 48 of the strainer housing 12 through the opening 50. When the basket 84 is fully installed within the chamber 48, the flange 96 of the basket 84 rests on top of the ends 61 of the projections 60 of the chamber 48, the overhang 134 of the basket 84 rests on top of the handle 326 of the clip 324, and the fins 122, 124, 138, 140 of the basket 84 are positioned proximate to the inner surface 58 of the chamber 48. In addition, the inlet 120 of the basket 84 aligns with the inlet 26 of the strainer housing 12, while the depression 130 of the basket 84 aligns with the outlet 28 of the strainer housing 12. It is noted that the basket 84 and the chamber 48 are each sized and shaped, as described above, such that the basket 84 may only be positioned and fully installed within the chamber 48 in a single manner, and such that the basket 84 does not substantially rotate within the chamber 48, thereby ensuring proper alignment between the inlet 120 of the basket 84 and the inlet 26 of the strainer housing 12 and between the depression 130 of the basket 84 and the outlet 28 of the strainer housing 12.

Referring to FIGS. 2A, 2B and 7B, the cover 64 closes off the strainer opening 50 in a fluid-tight manner, as described above. The cover 64 may be easily installed on and removed from the strainer housing 12 by turning the cover 64 on the projection 54 of the strainer housing 12 less than one-quarter of a turn, thereby providing fast and easy access to the strainer basket 84. Thus, the features and configuration of the cover 64 and the strainer housing 12, as described above, have several advantages over conventional covers that include threads and or screws for mounting onto associated conventional strainer baskets. As indicated above, the lid 68 is preferably made from a transparent material which enables a user to examine the inside of the strainer housing 12 without having to remove the cover 64 (e.g., to view the fluid level inside the chamber 48; to view the amount of leaves and other debris in the basket 84; etc.).

When the pump 10 is fully assembled, it is connected to a fluid circulation system of a swimming pool, spa or the like (not shown in the Figures). More particularly, the inlet 26 of the pump 10 is typically connected fluidly to a suction line (e.g., piping) of the system, with the suction line being connected fluidly to one or more skimmers and/or one or more main drains of the swimming pool (not shown in the Figures). The suction line, or a coupling connected thereto, which is known in the art, may include a set of internal threads that threadedly engage the external threads 34 of the annular flanged projection 30 of the inlet 26 of the pump 10 or a set of external threads that threadedly engage the internal threads 32 of the annular flanged projection 30 of the inlet 26 (not shown in the Figures). Alternatively, the annular flanged projection 30 need not include the internal threads 32 and/or the external threads 34 and hence could be connected to the suction line in another manner known in the art (not shown in the Figures).

The outlet 170 of the pump 10 is typically connected fluidly to a return line (e.g., piping) of the swimming pool that typically leads to other components of the system, such as valves, a filter, a chlorine generator and/or a heater. The return line, or a coupling connected thereto, which is known in the art, may include a set of internal threads that threadedly engage the external threads 176 of the annular flanged projection 172 of the outlet 170 of the pump 10, or a set of external threads that threadedly engage the internal threads 174 of the annular flanged projection 172 of the outlet 170 (not shown in the Figures). Alternatively, the annular flanged projection 170 need not include the internal threads 174 and/or the external threads 176 and hence could be connected to the return line in another manner known in the art. As previously indicated, the pump 10 can accommodate a return line that is positioned either horizontally, vertically or any position therebetween, i.e., positioning the outlet 170 of the casing 142 by rotating it in the aforedescribed manner.

When the pump 10 is activated, the shaft 308 of the motor 16 rotates and hence the impeller 144 rotates within the fluid chamber 168 of the casing 142, which causes a suction force that propels the fluid through the pump 10 and throughout the fluid circulation system of the swimming pool. In this regard, the fluid flows through the inlet 26 of the strainer housing 12 and through the inlet 120 of the strainer basket 84. The strainer basket 84 catches and collects leaves and other large debris that might clog the pump 10, while the fluid is permitted to pass through the perforations 108, 118 of the basket 84. The fluid flows through the outlet 28 of the strainer housing 12, into the inlet 220 and through the outlet 230 of the casing cover 146, and into the eye 208 of the impeller 144. The fluid is then directed out of the impeller 144 through the channels 210 thereof and into the fluid chamber 168 of the casing 142 and hence through the outlet 170 and into the return line of the system. When the pump 10 is not in operation, such as, for example, winterization, any fluid remaining in the strainer housing 12 can be drained by removing the plug 80 from the drain hole 76.

It is noted that the configuration and the features of the basket 84 prevent the outlet 28 of the strainer housing 12 from becoming blocked. For example, the fins 136 of the basket 84 prevent leaves and other large debris from blocking the perforations 108 located within the depression 130 of the basket 84, thereby enabling fluid to flow therethrough. In addition, the fins 122, 124, 138 of the basket 84 engage the inner surface 58 of the chamber 48, while the fin 140 of the basket 84 engages the inlet 220 of the casing cover 146 of the pump housing assembly 14. This configuration creates an alternate fluid flow path around the outer surface 102 of the basket 84 within the chamber 48. Consequently, in the event that the basket 84 becomes clogged with a heavy volume of debris that prevents the fluid from flowing through the perforations 108, 118, which would normally cause conventional baskets to expand outwardly, the fins 122, 124, 138, 140, prevent the basket 84 from expanding outwardly. As a result, the basket 84 remains rigid and hence fluid is permitted to flow around the outer surface 102 of the basket 84 unimpeded. Also, the depression 130 of the basket 84 forms a space between the basket 84 and the outlet 28 of the strainer housing 12, thereby providing an unimpeded fluid flow path into the outlet 28 of the strainer housing 12.

It is also noted that the pump 10 and its associated components may be easily and quickly disassembled and reassembled for maintenance, repair or replacement. Most notably, the pump 10 allows a user to easily and quickly change the position of he outlet 170 of the casing 142 from a vertical position to a horizontal position, and vice-versa, without the need to substantially disassemble and reassemble the components of the pump 10. This can be achieved by performing the following steps. First, all plumbing attached to the pump 10 (e.g., the return line and suction line of the system), the cover 64 is disengaged and removed from the strainer housing 12 as described above, and the basket 84 is removed from the chamber 48. Next, the clip 324 is easily disengaged from annular flanged projection 222 of the casing cover 146 by simply pulling it upwardly. This allows the strainer housing 12 to be easily disengaged from the pump housing assembly 14. To repeat for the sake of convenience, if it is desired to switch the position of the outlet 170 from a vertical position to a horizontal position, a user simply presses the button 274 of the motor lock ring 148 to release the latch 276 from the second tab member 196 of the casing 142, thereby enabling the casing 142 to be rotated until the latch 276 engages the first tab member 192 of the casing 142. Similarly, if it is desired to switch the position of the outlet 170 from a horizontal position to a vertical position, then a user simply presses the button 274 of the motor lock ring 148 to release the latch 276 from the first tab member 192 of the casing 142, thereby enabling the casing 142 to be rotated until the latch 276 engages the second tab member 196 of the casing 142. Unlike conventional pumps, the foregoing is achieved without the need to disassemble the pump housing assembly 14. That is, there is no need to remove the casing cover 146 from the casing 142, remove the impeller 144 from the shaft 308 of the motor 16 and/or remove the casing 142 from the motor lock ring 148 in order to rotate the casing 142 and position the outlet 170 as desired.

Once the outlet 170 is positioned as desired, the pump 10 is easily and quickly reassembled by reversing the aforesaid steps, i.e., the strainer housing 12 is attached to the casing cover 146, the clip 324 is inserted around the second annular groove 228 of the annular flanged projection 222 of the casing cover 146, the basket 84 is installed within the chamber 48 of strainer housing 12, and the cover 64 is installed on the strainer housing 12. Consequently, this reduces both time and labor costs.

It should be understood that the embodiment described herein is merely exemplary and that a person skilled in the art may make many variations and modifications without departing from the spirit and scope of the invention. Accordingly, all such variations and modifications are intended to be included within the scope of the invention as defined in the appended claims.

What is claimed is:

1. A liquid pump for use with a fluid circulation system for a recreational water body, comprising a strainer housing having an inner surface which defines a filtering chamber, an inlet in communication with said filtering chamber for receiving liquid to be filtered, and an outlet for discharging filtered liquid from said filtering chamber; a pump housing assembly having an annular protuberance defining an inlet for receiving liquid from said outlet of said strainer housing, said annular protuberance extending through said outlet of said strainer housing into said filtering chamber; and a clip releasably securable to said annular protuberance in said filtering chamber to inhibit inadvertent disengagement of said strainer housing from said pump housing.

2. The liquid pump of claim 1, comprising a strainer basket configured to be received by said strainer housing.

3. The liquid pump of claim 2, wherein said strainer basket is configured to provide a first fluid path therethrough from said inlet of said strainer housing to said outlet of said strainer housing.

4. The liquid pump of claim 3, including spacing means for spacing an outer surface of said strainer basket from said inner surface of said strainer housing so as to provide a second fluid path between said outer surface of said strainer basket and said inner surface of said strainer housing through which fluid can bypass said first fluid path when said strainer basket is clogged.

5. The liquid pump of claim 4, wherein said spacing means includes at least one fin extending from said outer surface of said strainer basket.

6. A liquid pump for use with a fluid circulation system for a recreational water body, comprising a pump housing assembly that includes a casing; a casing cover forming a fluid chamber with said casing and having an inlet through which filtered fluid can flow from a strainer housing; an outlet formed in said casing; an impeller positioned within said fluid chamber for pumping filtered liquid through said outlet; a lock ring securable to a motor and fastened to said casing such that said casing is rotatable between a first position, in which said outlet is arranged in a first orientation, and a second position, in which said outlet is arranged in a second orientation; and latching means for releasably latching said casing when said outlet is in said first and second orientations.

7. The liquid pump of claim 6, wherein one of said first and second orientations is configured to be generally vertically aligned in use, and wherein another one of said first and second orientations is, configured to be generally horizontally aligned in use.

8. The liquid pump of claim 6, wherein said latching means includes a latch provided with said lock ring and members provided with said casing to releasably engage said latch and thereby inhibit rotation of said casing relative to said lock ring.

9. The liquid pump of claim 8, wherein said lock ring is provided with a button for releasing engagement of said latch with said members.

10. The liquid pump of claim 8, wherein said members include first stop and tab members and second stop and tab members spaced from said first stop and tab members.

11. The liquid pump of claim 10, wherein said first stop and tab members are radially spaced from said second stop and tab members.

12. The liquid pump of claim 11, wherein said casing and said lock ring include central apertures configured to receive a shaft of the motor, and wherein said impeller is configured to be fastened to the shaft.

13. The liquid pump of claim 6, including said motor and said shaft thereof and further including a seal positioned for inhibiting flow of liquid from said fluid chamber to said motor.

14. The liquid pump of claim 6, including fastening means for rotatably fastening said casing to said lock ring.

15. The liquid pump of claim 14, wherein said fastening means include a collar positioned at a side of said lock ring opposite said strainer housing and proximal said aperture of said lock ring, and wherein said fastening means further include at least one locking member extending through said aperture of said lock ring and engaged with said collar of said lock ring.

16. The liquid pump of claim 15, wherein said lock ring has a second side facing said casing and a second collar extending from said second side and proximal said aperture of said lock ring, and wherein said casing has a first side facing said lock ring and a collar proximal said aperture of said casing between said first side of said casing and said at least one locking member, said collar of said casing cooperating with said second collar of said lock ring to space said first side of said casing from said second side of said lock ring.

17. The liquid pump of claim 6, including a strainer housing having an inner surface which defines a filtering chamber, an inlet in communication with said filtering chamber for receiving liquid to be filtered, and an outlet for discharging filtered liquid from said filtering chamber to said pump housing assembly.

18. The liquid pump of claim 17, including a strainer basket configured to be received by said strainer housing.

19. The liquid pump of claim 18, wherein said strainer basket is configured to provide a first fluid path therethrough from said inlet of said strainer housing to said outlet of said strainer housing.

20. The liquid pump of claim 19, including spacing means for spacing an outer surface of said strainer basket from said inner surface of said strainer housing so as to provide a second fluid path between said outer surface of said strainer basket and said inner surface of said strainer housing through which fluid can bypass said first fluid path when said strainer basket is clogged.

21. The liquid pump of claim 20, wherein said spacing means includes at least one fin extending from said outer surface of said strainer basket.

22. A liquid pump for use with a fluid circulation system for a recreational water body, comprising:
a strainer housing having an inner surface which defines a filtering chamber, an inlet in communication with said filtering chamber for receiving liquid to be filtered, and an outlet for discharging filtered liquid;
a pump housing assembly that includes a casing having a central aperture extending therethrough, a casing cover forming a fluid chamber with said casing and having an inlet through which filtered fluid can flow from said outlet of said strainer housing, an outlet formed in said casing, and an impeller positioned within said fluid chamber for pumping filtered liquid through said outlet;
a lock ring rotatably fastened to said casing and having a central aperture extending therethrough;
a motor secured to said lock ring and having a shaft extending through said central apertures of said lock ring and said casing, said shaft being fastened to said impeller for rotation thereof; and
a seal positioned to inhibit flow of liquid from said fluid chamber to said motor;
wherein said lock ring and said casing are provided with (a) fastening means for securing said lock ring to said casing such that said casing is rotatable between a first position, in which said outlet is arranged in a first orientation, and a second position, in which said outlet is arranged in a second orientation radially displaced from said first position, and (b) latching means for releasably latching said casing when said outlet is in said first and second orientations.

23. The liquid pump of claim 22, including:
a strainer basket having an outer surface and configured to be received by said strainer housing such that said strainer basket, when unclogged, provides a first fluid path therethrough from said inlet of said strainer housing to said outlet of said strainer housing;
said liquid pump being provided with spacing means for spacing said outer surface of said strainer basket from said inner surface of said strainer housing so as to provide a second fluid path therebetween through which fluid can bypass said strainer when said strainer is clogged.

24. A liquid pump for use with a fluid circulation system for a recreational water body, comprising:
a pump housing assembly that includes a casing; a casing cover forming a fluid chamber with said casing and having an inlet through which filtered fluid can flow; an outlet formed in said casing; an impeller positioned within said fluid chamber for pumping filtered liquid through said outlet; a lock ring securable to a motor and fastened to said casing such that said casing is rotatable between a first position, in which said outlet is arranged in a first orientation, and a second position, in which said outlet is arranged in a second orientation; fastening means for rotatably fastening said casing to said lock ring; and latching means for releasably latching said casing when said outlet is in said first and second orientations; and
a strainer housing having an inner surface which defines a filtering chamber, an inlet in communication with said filtering chamber for receiving liquid to be filtered, and an outlet for discharging filtered liquid from said filtering chamber to said inlet of said casing.

25. The liquid pump of claim 24, comprising a cover for closing an opening of said strainer housing, wherein said cover includes a cover lock ring having an annular array of locking members, and wherein said strainer housing includes a plurality of locking members configured to releasably interlock said annular array of locking members in a bayonet fashion.

26. The liquid pump of claim 25, comprising a strainer basket configured to be received by said strainer housing.

27. The liquid pump of claim 26, wherein said strainer basket is configured to provide a first fluid path therethrough from said inlet of said strainer housing to said outlet of said strainer housing.

28. The liquid pump of claim 27, including spacing means for spacing an outer surface of said strainer basket from said inner surface of said strainer housing so as to provide a second fluid path between said outer surface of said strainer basket and said inner surface of said strainer housing through which fluid can bypass said first fluid path when said strainer basket is clogged.

29. The liquid pump of claim 28, wherein said spacing means includes a plurality of fins extending from said outer surface of said strainer basket.

* * * * *